United States Patent
Nagai

(10) Patent No.: US 7,183,757 B2
(45) Date of Patent: Feb. 27, 2007

(54) SWITCHING POWER SOURCE, SWITCHING POWER SOURCE CONTROL METHOD, ELECTRIC APPARATUS HAVING THE SWITCHING POWER SOURCE, AND PRINTING APPARATUS HAVING THE SWITCHING POWER SOURCE

(75) Inventor: Masayuki Nagai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/276,094

(22) Filed: Feb. 14, 2006

(65) Prior Publication Data

US 2006/0181256 A1 Aug. 17, 2006

(30) Foreign Application Priority Data

Feb. 17, 2005 (JP) ............................. 2005-040894
Jan. 26, 2006 (JP) ............................. 2006-018015

(51) Int. Cl.
*G05F 1/618* (2006.01)

(52) U.S. Cl. ...................... 323/285; 323/283; 323/284; 323/351

(58) Field of Classification Search ........ 323/222–224, 323/282–285, 351
See application file for complete search history.

(56) References Cited

U.S. PATENT DOCUMENTS 5,677,618 A * 10/1997 Fiez et al. ................... 323/282
6,137,275 A * 10/2000 Ravon ......................... 323/274
6,784,648 B2 * 8/2004 Mitamura et al. .......... 323/282

FOREIGN PATENT DOCUMENTS

JP 2002-64383 2/2002
JP 2002-300772 10/2002

OTHER PUBLICATIONS

"About Characteristic of DC—DC Converter Controlled by Delta-Sigma Modulation", Yasuhide Imamura, et al., Technical Report Of IEICE. EE2002-78, pp. 89-94 (Feb. 2003).

* cited by examiner

*Primary Examiner*—Gary L Laxton
(74) *Attorney, Agent, or Firm*—Fitzpatrick, Cella, Harper & Scinto

(57) ABSTRACT

There is provided a switching power source capable of quickly responding to a change in output at high efficiency over a wide output voltage range. The power source includes an integrator, a comparator which compares an output from the integrator with a quantization reference value, and a sampling circuit which samples an output from the comparator in synchronism with a clock signal. The power source further includes a ΔΣ modulator which quantizes an output from the integrator, outputs a quantized signal, and negative-feeds back the quantized signal to suppress the quantization error of the input signal. In the switching power source, a resistance value adjustment circuit changes the hysteresis width of the quantization reference value by changing the resistance value of the variable resistor of the comparator on the basis of a signal output from a detection circuit which detects at least one of an external control signal and the output voltage and load current of the switching power source.

11 Claims, 18 Drawing Sheets

SWITCHING POWER SOURCE, SWITCHING POWER SOURCE CONTROL METHOD, ELECTRIC APPARATUS HAVING THE SWITCHING POWER SOURCE, AND PRINTING APPARATUS HAVING THE SWITCHING POWER SOURCE

FIELD OF THE INVENTION

This invention relates to a switching power source, a switching power source control method, an electric apparatus having the switching power source, and a printing apparatus having the switching power source. More particularly, this invention relates to an increase in the efficiency of a switching power source controlled by a $\Delta\Sigma$ modulator, and an increase in response speed to a change in an output from the switching power source.

BACKGROUND OF THE INVENTION

Switching power sources are widely exploited as the power sources of electric apparatuses used in houses and offices. As methods for the switching power sources, there are known a pulse width modulation method and a method using $\Delta\Sigma$ modulation.

In a switching power source using a conventional pulse width modulation method (PWM), the switching frequency is always constant.

In a switching power source using $\Delta\Sigma$ modulation, the switching frequency changes in accordance with the value of a signal input to a $\Delta\Sigma$ modulator. A conventional synchronous rectification type down converter using a general $\Delta\Sigma$ modulator will be exemplified with reference to a circuit diagram shown in FIG. 15.

In FIG. 15, a signal output from an error amplifier 16 is input to a $\Delta\Sigma$ modulator 1, where the signal is input to an integrator 4 and integrated by it. A signal output from the integrator 4 is input to a quantizer 19, and quantized in accordance with a quantization reference value 6 every cycle (Ts) of a sampling clock output from a sampling clock oscillator 18. The output quantized by the quantizer 19 is negative-fed back to the input of the $\Delta\Sigma$ modulator 1 so as to suppress the quantization error of the signal input to the $\Delta\Sigma$ modulator 1. A 1-bit signal output from the $\Delta\Sigma$ modulator 1 turns on/off a power switch in a voltage converter 9 to smooth an output from the power switch, thereby obtaining a desired output voltage.

The switching power source having such a $\Delta\Sigma$ modulator has the following characteristic. More specifically, when the integrator 4 is of the first order, the count at which a signal output from the $\Delta\Sigma$ modulator 1 changes in a unit time changes linearly with a monotonous increase and decrease having a peak at the center with respect to the output value of the error amplifier 16 serving as a signal input to the $\Delta\Sigma$ modulator 1. This characteristic is disclosed in Japanese Patent Laid-Open No. 2002-300772, and "Characteristics of DC-DC Converter Using $\Delta\Sigma$ Modulation Control", Yasuhide Imamura, Tetsuro Tanaka, and Hiroshi Yoshida, Technical Report of IEICE, EE2002-78. In the switching power source having the $\Delta\Sigma$ modulator, the cycle of a 1-bit signal output from the $\Delta\Sigma$ modulator 1 serves as a cycle for driving the switch of the switching power source.

From this, the output value of the error amplifier 16 and the switching frequency of the switching power source have a relationship as shown in FIG. 9. In FIG. 9, the maximum value of the switching frequency is ½ the frequency (fs) of a sampling clock output from the sampling clock oscillator 18. The characteristic of a higher-order $\Delta\Sigma$ modulator having a plurality of integrators does not change with a monotonous increase and decrease, as shown in FIG. 9, but tends to similarly increase on average and decrease on average.

In the switching power source having the $\Delta\Sigma$ modulator, the switching frequency is lower than the maximum switching frequency (=½·fs) determined by the sampling frequency (fs) of the $\Delta\Sigma$ modulator in the range of a voltage input to the $\Delta\Sigma$ modulator. For this reason, the switching loss can be reduced. By using this feature, the switching frequency at the highest speed can be set higher than that in PWM control. This is advantageous since the control frequency can be set high.

The operation of the power source will be described more specifically. In a steady state in which no output state of the switching power source changes, a switching frequency (fsw) of the switching power source decreases, thus reducing the switching loss. In a transient state in which an output from the power source changes, the switching frequency (fsw) of the switching power source increases, thereby enabling a quick response to an abrupt change in load or output voltage. Of switching power sources having $\Delta\Sigma$ modulators, a diode rectification type switching power source as shown in FIG. 10 can reduce the switching frequency at a light load. This switching power source can greatly increase the efficiency at a light load.

However, the switching power source having the $\Delta\Sigma$ modulator suffers the following problems.

As shown in FIG. 9, in response to an output from the error amplifier 16, the switching frequency of the switching power source becomes zero at the upper and lower limits of an input which can be modulated. The switching frequency has a triangular-shaped output characteristic with which the switching frequency reaches its peak at the median of an output from the error amplifier 16. In other words, the switching frequency increases from the lower limit value of an output from the error amplifier 16 to the median, and decrease from the median to the upper limit value.

In the conventional synchronous rectification type switching power source shown in FIG. 15, when its output state does not change, the output voltage of the error amplifier 16 is determined by the ratio of a voltage (Vin) at an input voltage terminal 11 and a voltage (Vout) at an output voltage terminal 12. If the output value of the error amplifier 16 always keeps a value around the center of the triangular shape shown in FIG. 9 in accordance with the relationship between the input voltage (Vin) and output voltage (Vout) of the switching power source, the switching frequency is always high. Hence, no advantage of the switching power source using the $\Delta\Sigma$ modulator can be obtained.

Even in the diode rectification type switching power source shown in FIG. 10, as the load current increases, the output value of the error amplifier 16 may vary around the median of the output range of the error amplifier 16 that can be modulated by the $\Delta\Sigma$ modulator 1 (see FIG. 9). Thus, the switching count may increase at a light load, thus decreasing the power conversion efficiency due to an increase in the switching loss, (see Japanese Patent Laid-Open No. 2002-300772).

In order to overcome these drawbacks, Japanese Patent Laid-Open No. 2002-300772 discloses a switching power source using a $\Delta\Sigma$ modulator in which a frequency control circuit is arranged in the $\Delta\Sigma$ modulator to control the frequency (fs) of a sampling signal. This configuration adjusts the switching frequency.

FIG. 11 shows a change in switching frequency upon a change in sampling frequency (fs).

Japanese Patent Publication Laid-Open No. 2002-64383 discloses a function of inhibiting re-inversion of a signal output from a ΔΣ modulator when the number of clocks output upon inversion of the output signal is equal to or smaller than a preset value N (N≧2). By using this function, the power conversion efficiency can be increased by preventing an excessive increase in switching frequency, and the above-described drawbacks can be overcome.

However, the method disclosed in Japanese Patent Laid-Open No. 2002-300772 poses the following problems. More specifically, when the sampling frequency (fs) is changed at a given rate, as shown in FIG. 11, the switching frequency over the entire voltage range of an output from the error amplifier which serves as a signal input to the ΔΣ modulator changes at the same rate. Thus, if a power source output frequently changes, the sampling frequency (fs) must always be controlled in accordance with the power source output. As a result, it becomes complicated and difficult to control the sampling frequency (fs) in accordance with various situations, such as a case where the power source output abruptly changes at high speed.

If the switching frequency is decreased by decreasing the sampling frequency (fs), the control frequency also decreases as a whole, quantization noise becomes large, and the control accuracy decreases.

According to the method disclosed in Japanese Patent Publication Laid-Open No. 2002-64383, the switching frequency is defined by the clock count (N). For this reason, in order to finely adjust the switching frequency, the clock frequency, which determines the inversion period of a signal output from the ΔΣ modulator, must be set much higher than the switching frequency.

As described above, the ΔΣ modulation type switching power source needs to quickly respond to a change in power source output at high efficiency over a wide output voltage range without changing the sampling frequency (fs) or complicating the configuration or control.

SUMMARY OF THE INVENTION

Accordingly, the present invention is conceived as a response to the above-described disadvantages of the conventional art.

For example, a ΔΣ modulation type switching power source according to the present invention is capable of quickly responding to a change in output at high efficiency over a wide output voltage range with a simple control and configuration.

According to one aspect of the present invention, preferably, there is provided a switching power source which includes; an integrator which integrates an input signal; a comparator which compares an output from the integrator with a quantization reference value; a sampling circuit which samples an output from the comparator in synchronism with a clock signal; and a modulator which quantizes the output from the integrator, outputs a quantized signal, and negative-feeds back the quantized signal to suppress a quantization error of the input signal, whereby modulating an analog signal or multi-bit digital signal by the modulator, and driving a power switching element in accordance with the quantized signal to supply power, comprising: input means for externally inputting a control signal; and reference value control means for changing a hysteresis width of the quantization reference value of the comparator on the basis of the control signal input by said input means.

In accordance with the invention as described above, the hysteresis width can be decreased in a case where a quick response to a change in an output from the switching power source is required, and otherwise increased in order to decrease the switching frequency of the power switching element. With this operation, the hysteresis width can be so changed as to decrease the switching frequency of the power switching element when the value of an input signal falls within a region around the median of the changeable range of the input signal.

The efficiency can be increased over a wide output voltage range without complicating the configuration or control. A quick response to a change in output can be implemented.

According to another aspect of the present invention, preferably, there is provided an electric apparatus such as a printing apparatus using the switching power source of the above configuration.

According to still another aspect of the present invention, preferably, there is provided a control method applied to a switching power source which includes: an integrator which integrates an input signal; a comparator which compares an output from the integrator with a quantization reference value; a sampling circuit which samples an output from the comparator in synchronism with a clock signal; and a modulator which quantizes the output from the integrator, outputs a quantized signal, and negative-feeds back the quantized signal to suppress a quantization error of the input signal, whereby modulating an analog signal or multi-bit digital signal by the modulator, and driving a power switching element in accordance with the quantized signal to supply power, comprising: an input step of externally inputting a control signal; and a reference value control step of changing a hysteresis width of the quantization reference value of the comparator on the basis of the control signal input in the input step.

The invention is particularly advantageous since the switching frequency of the power switching element can be decreased without shortening the control cycle of the power source in the switching power source having the ΔΣ modulator.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
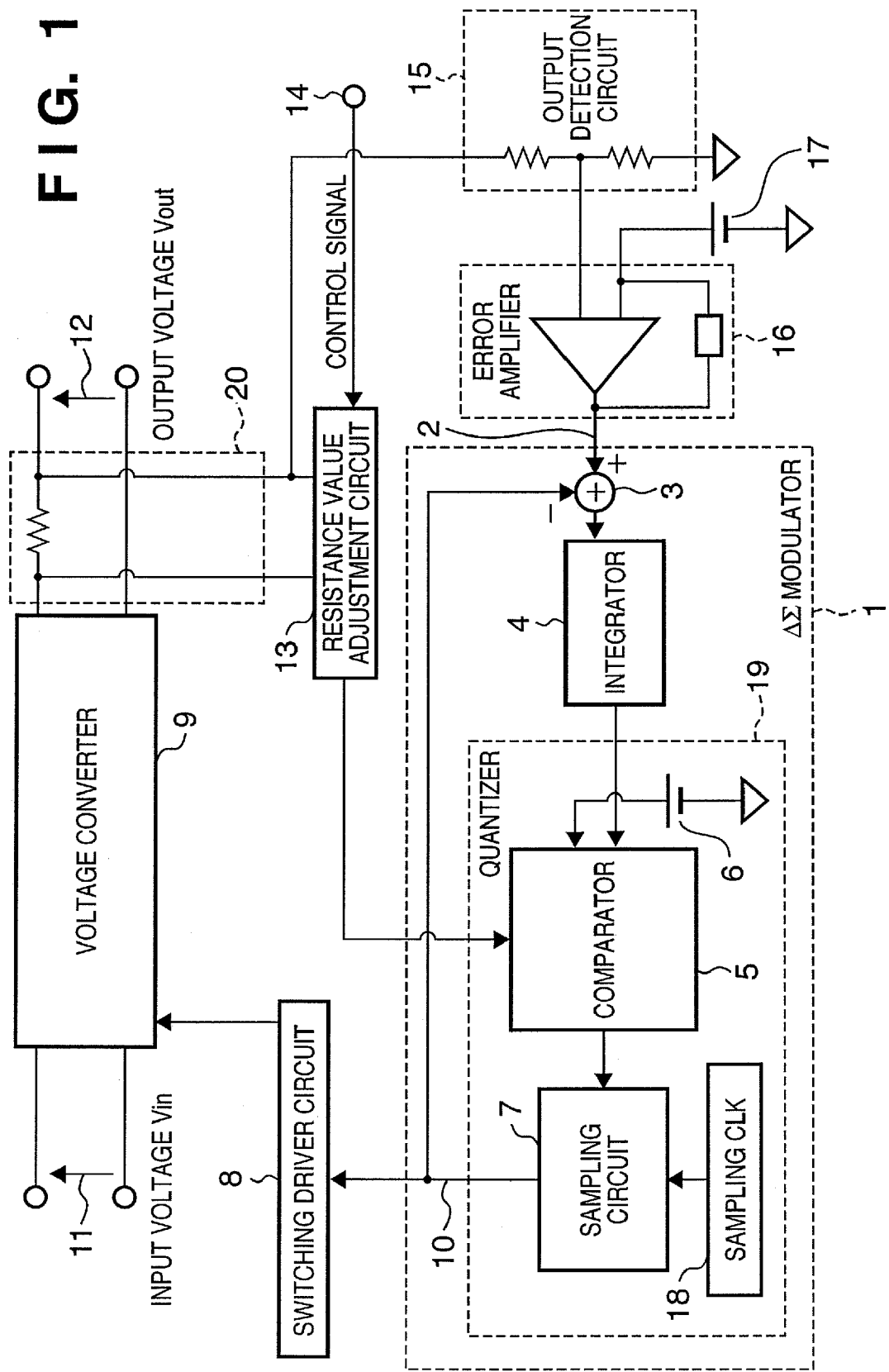
FIG. 1 is a block diagram showing the configuration of a switching power source according to the first embodiment of the present invention.

Preferred embodiments of the present invention will now be described in detail in accordance with the accompanying drawings.

Note that building components to be described in the following embodiments are merely illustrative, and the scope of the present invention is not limited to them. In a description of the drawings, the same reference numerals denote the same or similar parts.

<First Embodiment>

FIG. 1 is a block diagram showing the configuration of a switching power source according to the first embodiment of the present invention.

In FIG. 1, a voltage output from an error amplifier 16 is input to an input terminal 2 of a $\Delta\Sigma$ modulator 1, and then to an adder 3. An output from the adder 3 passes through an integrator 4, and is compared with a quantization reference value 6 by a comparator 5. An output from the comparator 5 is input to a sampling circuit 7, where the output is sampled at the cycle of a sampling clock output from a sampling clock oscillator 18. A switching duty pulse is output from a switching duty pulse output line 10. The switching duty pulse is input to a switching driver circuit 8, which supplies, to a voltage converter 9, a voltage and current enough to drive a power switching element. At the same time, a signal output from the switching duty pulse output line 10 is fed back to the adder 3. The fed-back signal value is subtracted from the output value of the error amplifier 16 that is input to the input terminal 2 of the $\Delta\Sigma$ modulator 1.

The voltage converter 9 drives its internal power switch by a signal input from the switching driver circuit 8, and rectifies and smoothes an output from the power switch. In this way, a desired output voltage (Vout) is applied to an output voltage terminal 12 from a voltage (Vin) input to an input voltage terminal 11. The output voltage (Vout) is divided by an output detection circuit 15, and compared with a reference voltage 17 by the error amplifier 16. The error is amplified and output to the $\Delta\Sigma$ modulator 1.

A resistance value adjustment circuit 13 outputs a signal to the comparator 5 on the basis of the values of the output voltage (Vout) and load current of the voltage converter 9 (or changes in output voltage (Vout) or change in the load current) that are detected by an output voltage/output current detection circuit 20. The output voltage/output current detection circuit will be referred to as a detection circuit hereinafter. Upon reception of this signal, the comparator 5 changes the quantization reference value, and gives a hysteresis to the quantization reference value (i.e., changes the hysteresis width of the quantization reference value). Note that the hysteresis width of the quantization reference value of the comparator 5 may be changed on the basis of a control signal externally input to the power source via a control signal detection terminal 14.

Figure 2:
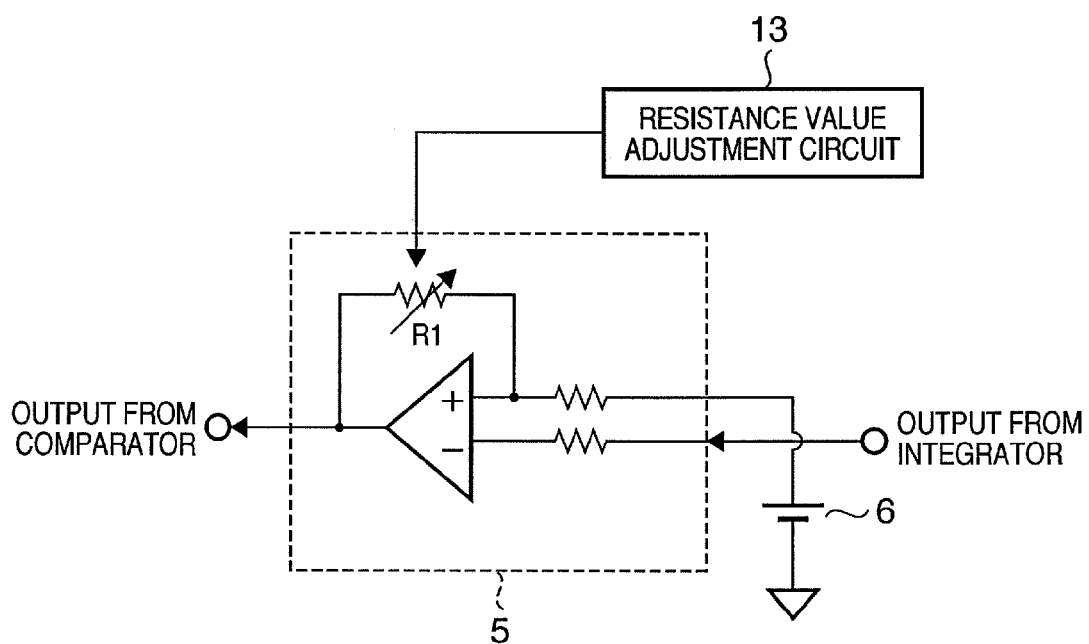
FIG. 2 is a block diagram showing the internal arrangement of a comparator in more detail according to the first embodiment.

FIG. 2 is a block diagram showing the internal arrangement of the comparator 5 in more detail. The operation of changing the hysteresis width of the quantization reference value of the comparator 5 by a signal from the resistance value adjustment circuit 13 will be explained with reference to FIG. 2.

As shown in FIG. 2, the comparator 5 incorporates a variable resistor R1, which is implemented by, e.g., an electronic volume control and can continuously change the resistance value within a desired range. The resistance value adjustment circuit 13 adjusts the resistance value of the variable resistor R1 to a proper value on the basis of an output voltage and output current detected by the detection circuit 20, or a detection signal input via the control signal detection terminal 14. In this manner, the resistance value adjustment circuit 13 adjusts the hysteresis width of the quantization reference value of the comparator 5.

More specifically, in a case where mainly the power source output changes and a quick response to the change is required, the resistance value adjustment circuit 13 decreases the hysteresis width of the quantization reference value of the comparator. In other cases, especially in a case where the switching frequency is decreased to reduce the loss, the resistance value adjustment circuit 13 increases the hysteresis width of the quantization reference value of the comparator.

Figure 18:
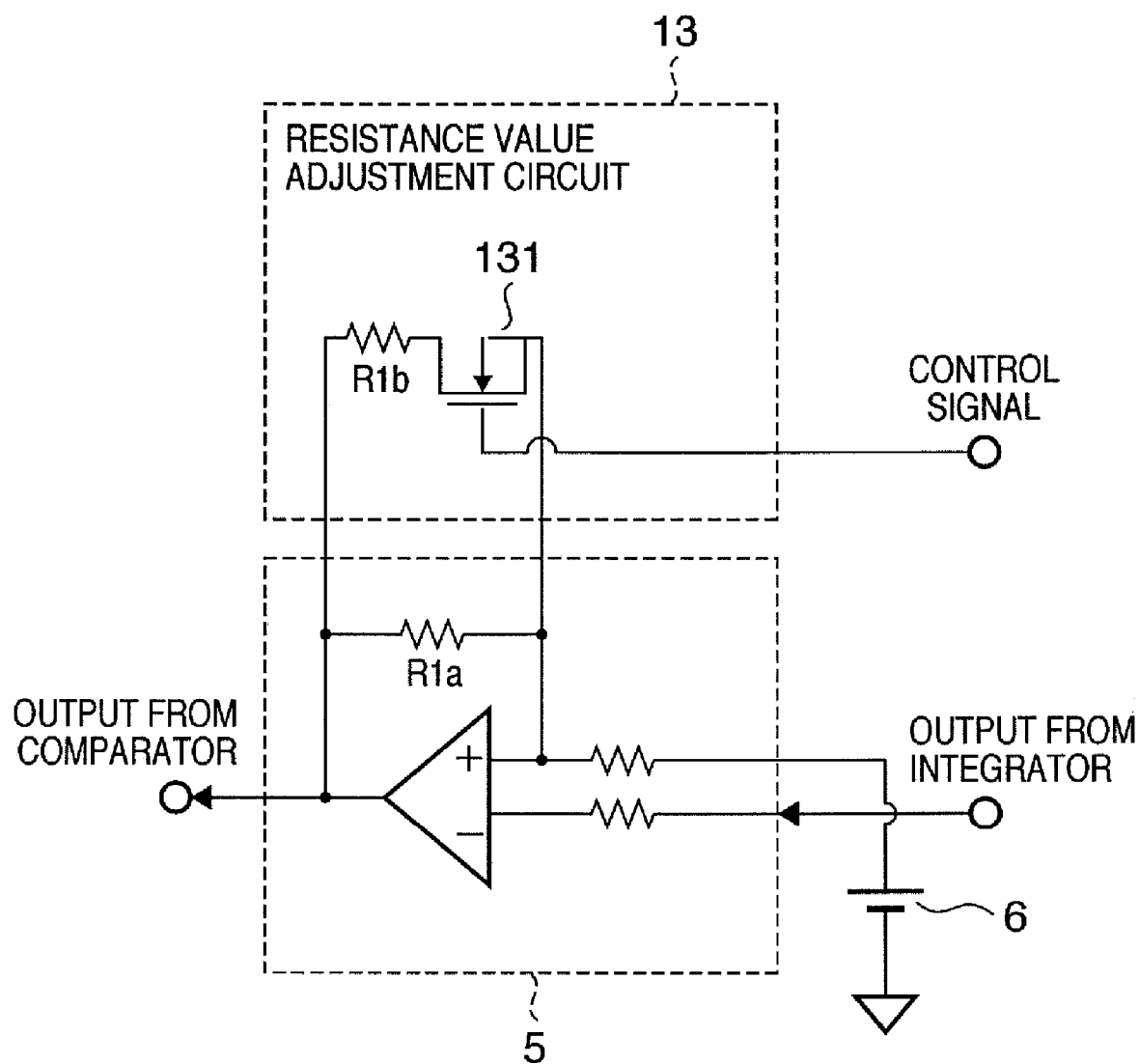
FIG. 18 is a circuit diagram showing the specific configuration of a resistance value adjustment circuit 13 shown in FIG. 2.

FIG. 18 is a circuit diagram showing the specific configuration of the resistance value adjustment circuit 13 shown in FIG. 2.

In this configuration, the resistance value adjustment circuit 13 changes the resistance value of the variable resistor R1 in FIG. 2 by a MOS switch 131 and two resistors R1a and R1b having constant resistance values. The MOS switch 131 is switched between ON and OFF by a control signal from an electric apparatus. When the variable resistor R1 is made up of the resistors R1a and R1b and the MOS switch 131, the resistance value of the variable resistor R1 changes as follows in response to ON/OFF operation of the MOS switch 131. That is, when the MOS switch 131 is ON, R1=(R1a×R1b)/(R1a+R1b), and when the MOS switch 131 is OFF, R1=R1a.

For example, the electric apparatus outputs a high-level (H) control signal in a steady state in which neither the power source voltage nor load abruptly changes. Based on the high-level control signal, the MOS switch 131 is turned on. At this time, the value of the variable resistor becomes R1=(R1a×R1b)/(R1a+R1b), and its resistance value becomes smaller than that when the MOS switch 131 is OFF. In this case, the hysteresis width of the comparator 5 becomes large. As a result, unnecessary switching in the steady state of the power source is suppressed, thus increasing the efficiency.

When the load abruptly changes, the electric apparatus outputs a low-level (L) control signal in advance. Based on the low-level control signal, the MOS switch 131 is turned off. At this time, the value of the variable resistor becomes R1=R1a, and the resistance value of the variable resistor R1 becomes larger than that when the MOS switch 131 is ON. In this case, the hysteresis width of the comparator 5 becomes small, and the electric apparatus can operate at a high switching frequency, thus making it possible to quickly respond in a transient state.

The timings when the quantization reference value is switched are preferably set to those synchronized with the leading and trailing edges of the switching duty pulse of the switching power source.

The operation of the switching power source when the quantization reference value of the quantizer of the $\Delta\Sigma$ modulator has a hysteresis characteristic in the first embodiment will be explained in comparison with a conventional art.

Figure 14:
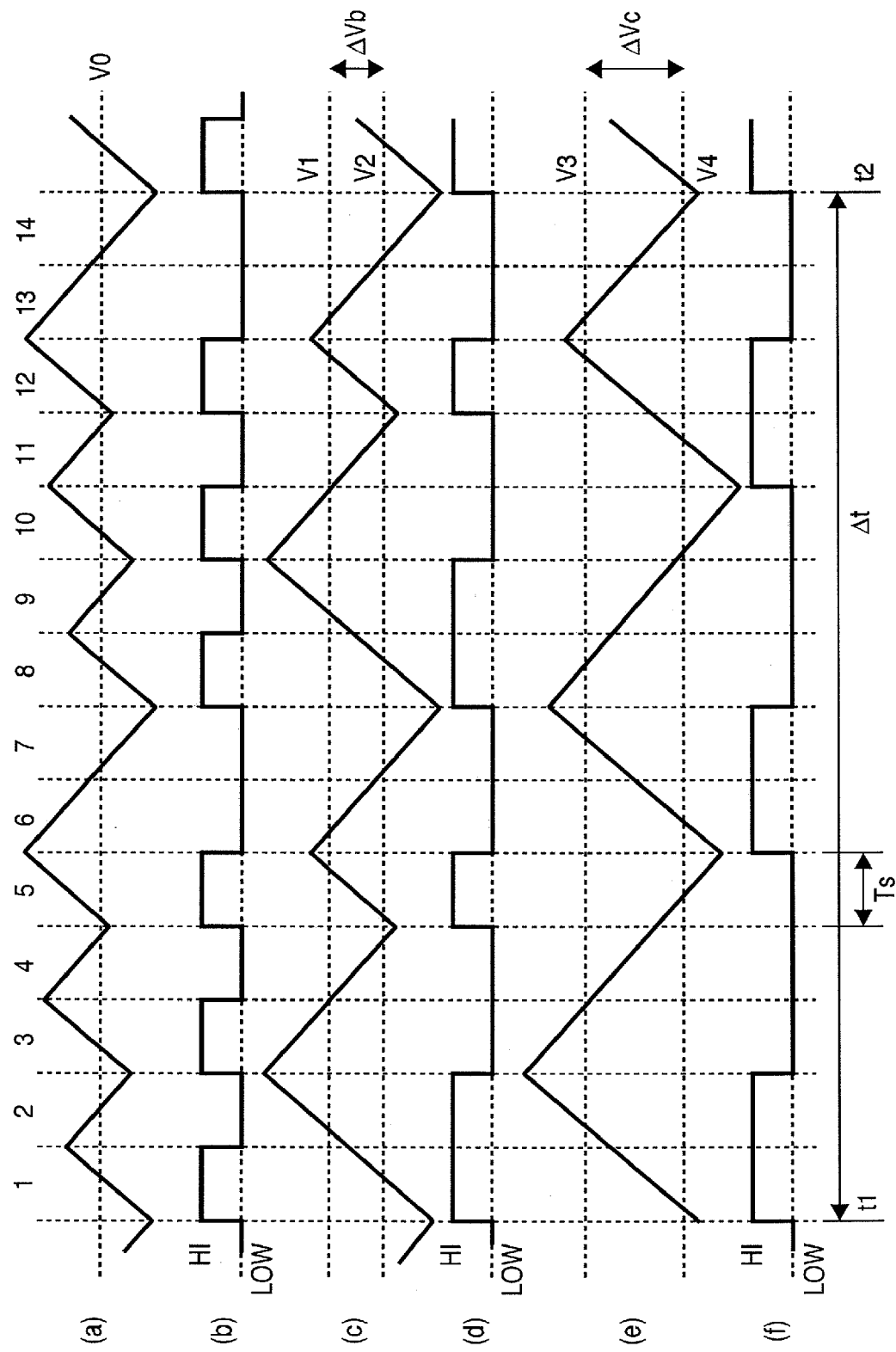
FIG. 14 is a timing chart showing the output waveform of the integrator of the switching power source and a quantized signal output from the $\Delta\Sigma$ modulator.
Figure 15:
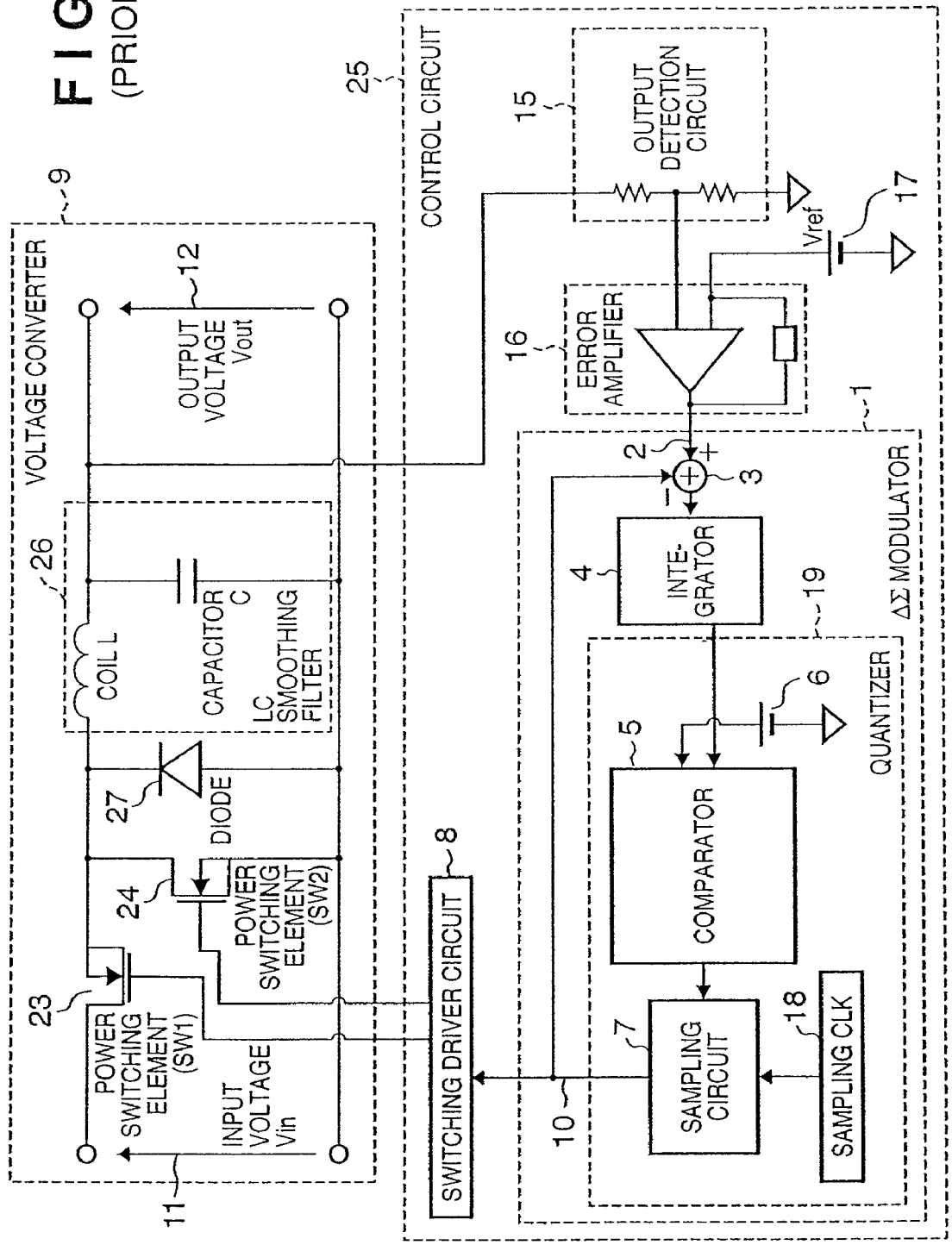
FIG. 15 is a block diagram showing the configuration of a switching power source having a conventional $\Delta\Sigma$ modulator.

FIG. 14 is a timing chart showing a quantized output from the $\Delta\Sigma$ modulator, and the output waveform of the integrator of a conventional $\Delta\Sigma$ modulation type switching power source shown in FIG. 15, and of the switching power source shown in FIG. 1 in which the quantization reference value has a hysteresis characteristic.

In FIG. 14, (a) and (b) show the output waveform of the integrator and a quantized output from the $\Delta\Sigma$ modulator in the conventional switching power source (to be referred to as switching power source A hereinafter) shown in FIG. 15, respectively; (c) and (d), the output waveform of the integrator and a quantized output from the $\Delta\Sigma$ modulator in the switching power source (to be referred to as switching power source B hereinafter) according to the first embodiment shown in FIG. 1, respectively; and (e) and (f), the output waveform of the integrator and a quantized output from the $\Delta\Sigma$ modulator in another switching power source (to be referred to as switching power source C hereinafter), respectively. These three switching power sources are different in only hysteresis characteristic to the quantization reference value, and identical in the remaining circuit configuration and circuit constants.

The quantization reference value of switching power source A is "V0". The quantized value of switching power source A changes to low level (LOW) when the output voltage (V) of the integrator 4 is V≧V0 at the timing of a predetermined cycle, and high level (HI) when V<V0. The quantization reference value of switching power source B has a hysteresis width $\Delta Vb$ (=V1−V2). The quantized value of switching power source B changes to low level when the output voltage (V) of the integrator 4 is V≧V1 at the timing of a predetermined cycle, and high level when V<V2. Note that the level is not switched when V2≦V<V1.

The quantization reference value of switching power source C has a hysteresis width $\Delta Vc$ (=V3−V4). The quantized value of switching power source C changes to low level when the output voltage (V) of the integrator 4 is V≧V3 at the timing of a predetermined cycle, and high level when V<V4. Note that |$\Delta Vc$|>|$\Delta Vb$|. Assume that an output from the integrator 4 increases and decreases with constant gradients, and these gradients are identical between the switching power sources.

In FIG. 14, (a), (c), and (e) show changes in the output voltages of the integrators in switching power sources A, B, and C, respectively. These output voltages are sampled at timings of the sampling cycle (Ts) that are represented by vertical broken lines in FIG. 14. An output from the integrator 4 is quantized by the quantizer 19. In FIG. 14, (b), (d), and (f) show the waveforms of signals output from the $\Delta\Sigma$ modulators 1 in switching power sources A, B, and C, respectively. A signal output from the $\Delta\Sigma$ modulator 1 is input to the switching driver circuit 8 which drives the power switch of the switching power source.

Signals output from the $\Delta\Sigma$ modulators 1 in switching power sources A, B, and C shown in (b), (d), and (f) of FIG. 14 will be compared. Assume that high level (HI) corresponds to switch-on, and low level (LOW) corresponds to switch-off. Under this condition, the total switch-on (high-level) time during a time $\Delta t$ (=14 Ts) between time t1 and time t2 shown in FIG. 14 is 6 Ts in all the switching power sources. During the time $\Delta t$, the ratio of the switch-on time is equal between the switching power sources. In (a) and (c) out of three waveforms shown in (a), (c), and (e) of FIG. 14, the same pattern as the waveform from cycle 1 to cycle 7 is also detected in cycle 8 to cycle 14. In other words, an output is repeated in a cycle of $\Delta t/2$. In (e), the waveform from cycle 1 to cycle 14 is repeated in a cycle of $\Delta t$. Even during a time longer than the time $\Delta t$, the ratio of the switch-on time is equal between the switching power sources unless the load at the output destination is greatly changed.

The count at which the switch is switched from ON to OFF during $\Delta t$ is 6 in switching power source A, 4 in switching power source B, and 3 in switching power source C, which are different from each other. Assuming that the switching frequency of switching power source A having no hysteresis width is 100%, that of switching power source B is 66.6%, and that of switching power source C is 50%. These switching frequencies greatly decrease.

The switching power source according to the first embodiment gives a hysteresis width to the quantization reference value of the $\Delta\Sigma$ modulator, and can decrease the ON/OFF count of the power switching element of the voltage converter without changing the switch-on time of the switching power source. That is, the switching frequency can be decreased without changing the switch-on time of the switching power source. Note that the switch-on time is also called an ON period.

The first embodiment can reduce the switching loss by decreasing only the switching frequency without decreasing, e.g., the sampling frequency of an output voltage, i.e., the control frequency of the power source.

The relationship between the hysteresis width and the switching frequency will be explained. The hysteresis width is represented by $\Delta Vh$ [%] using, as a reference, a change amount (Vi) of an output from the integrator 4 of the $\Delta\Sigma$ modulator during the sampling cycle (Ts). In other words, $\Delta Vh$ [%] is a ratio of the hysteresis width to the change amount (Vi) of the output from the integrator during the period of Ts. ΔVh is represented as ΔVh [%]=hysteresis/change amount (Vi) of the output from the integrator during the period of Ts×100. The change amount (Vi) is obtained as a result of experiments on the basis of the specifications of the power source and a load at the power supply destination. When the hysteresis width=Vi, ΔVh=100 [%]. When a first-order ΔΣ modulator comprises one integrator having a resistor of a resistance value R2 and a capacitor of a capacitance C1, Vi is given as follows. That is, when the output voltage of the quantizer is VHI volts [v] at high level and 0 volt [v] at low level, Vi=Ts·VHI/(C1·R2). Note that for the sake of simplicity in explanation, the output voltage range (Ve) of the error amplifier satisfies 0≦Ve≦VHI.

The output voltage (Ve) of the error amplifier and the output voltage (either VHI volts or 0 volt) of the quantizer are added by the adder 3.

Depending on the value ΔVh [%], the change range of the switching frequency to the output value of the error amplifier changes.

Figure 8:
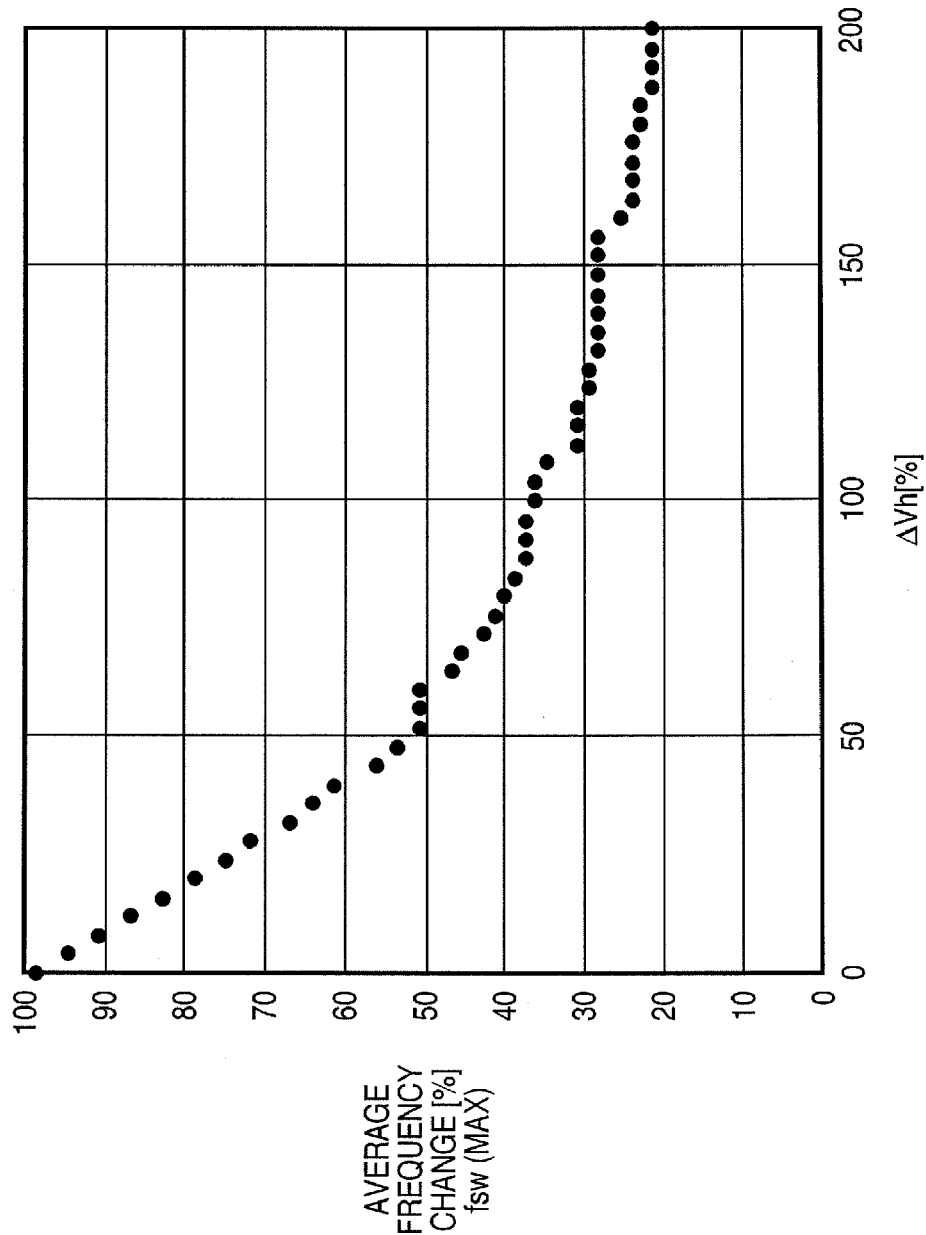
FIG. 8 is a graph showing the relationship between the hysteresis width and the change range of the switching frequency.
Figure 9:
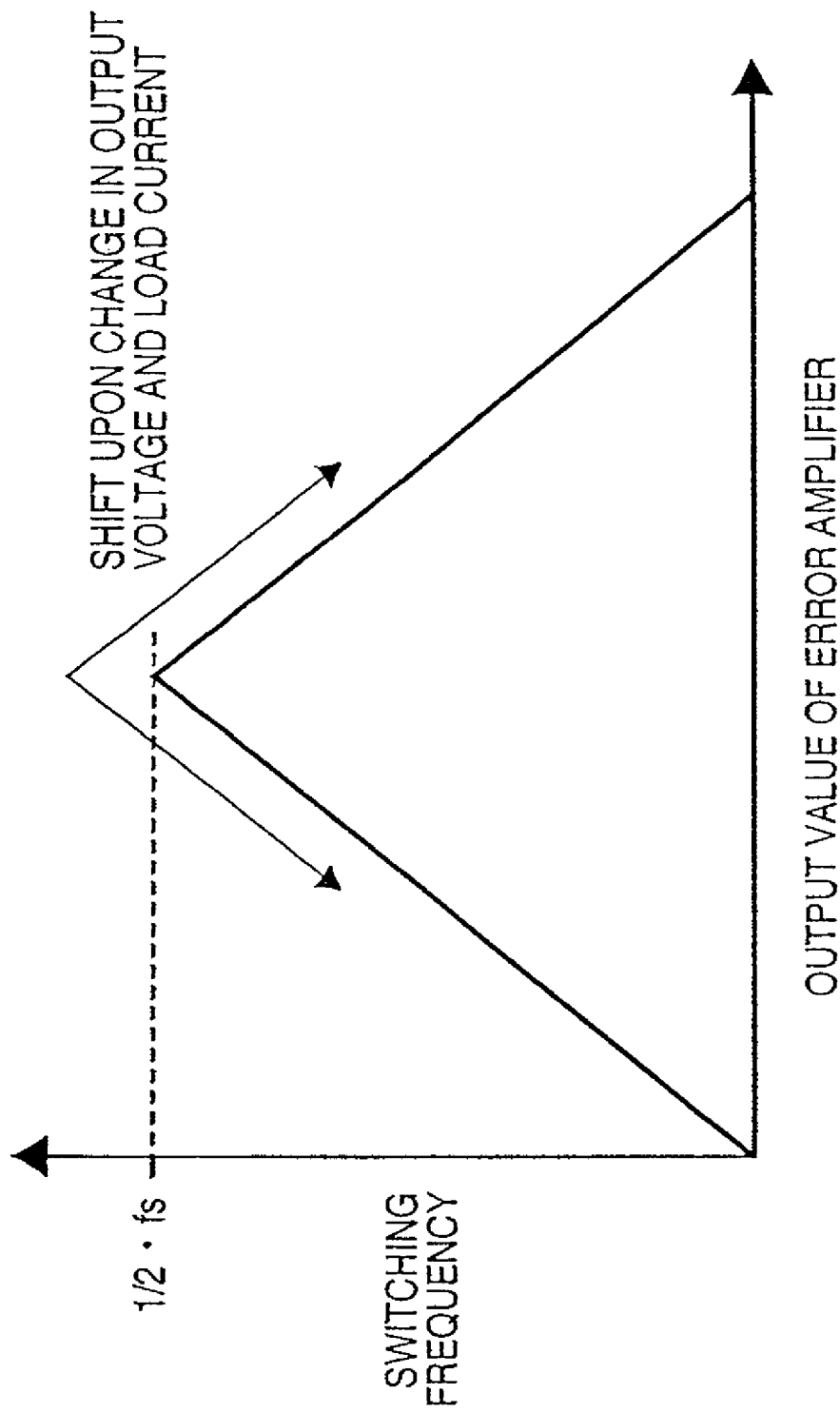
FIG. 9 is a graph showing the relationship between the switching frequency and the output value of the error amplifier of a switching power source having a conventional $\Delta\Sigma$ modulator.

FIG. 8 is a graph showing the relationship between ΔVh [%] and fsw(MAX) [%]. FIG. 8 reveals the change range (change rate) of the switching frequency to the output value of the error amplifier at a given value ΔVh [%]. In FIG. 8, the switching frequency (=½fs) at ΔVh [%]=0 [%] is defined as 100 [%], and represented by fsw(MAX) [%] When ΔVh [%]=0 [%], the hysteresis width is 0, i.e., no hysteresis exists. From FIG. 8, the switching frequency decreases as the hysteresis width increases. FIG. 9, which has been referred to in the conventional art, shows the distribution of outputs from the error amplifier when ΔVh [%]=0 [%].

The relationship between the change rate of the switching frequency and the hysteresis width will be described.

Figure 12:
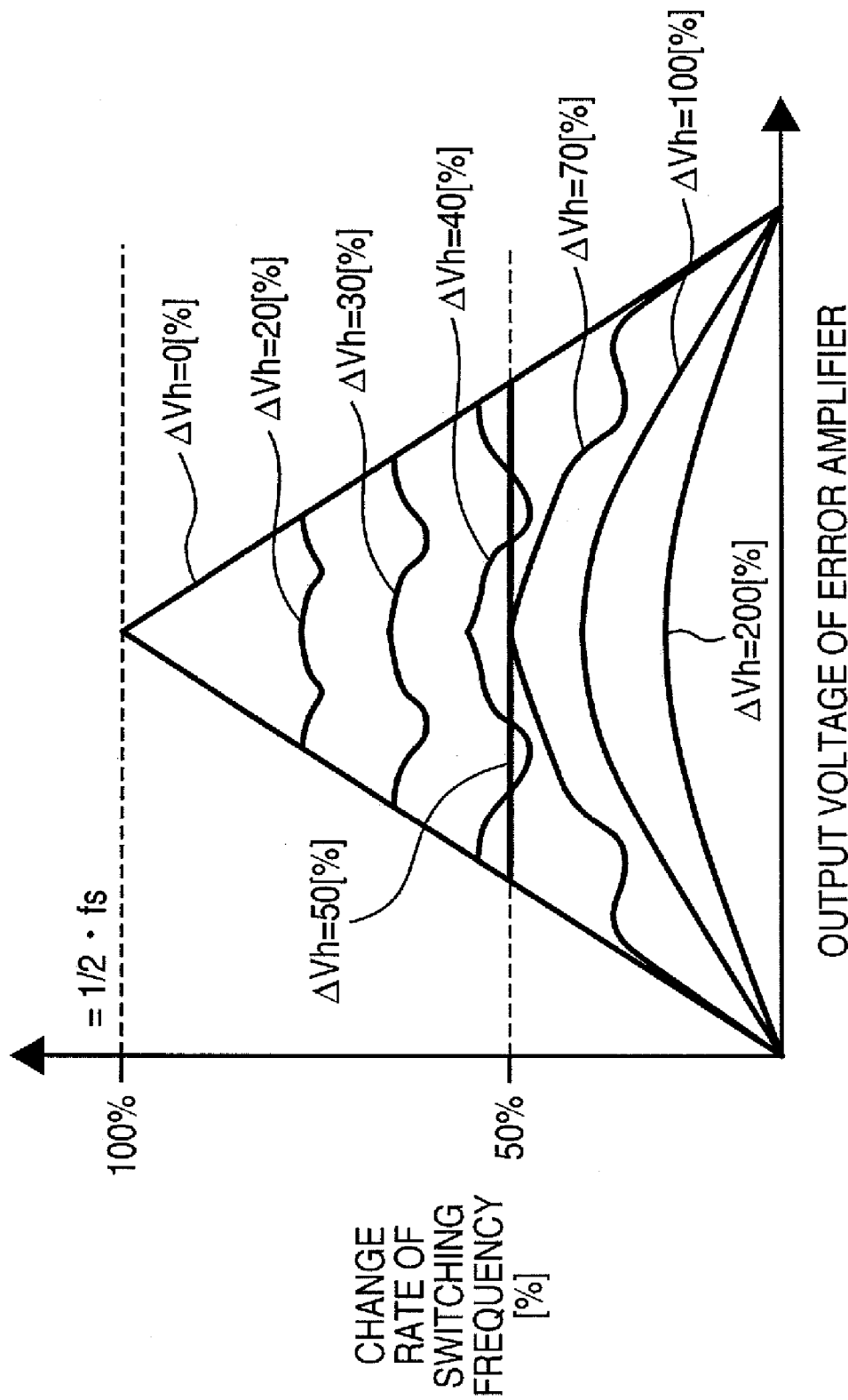
FIG. 12 is a graph showing the switching frequency of the switching power source when the hysteresis width is changed.

FIG. 12 is a graph showing the switching frequency of the switching power source having the ΔΣ modulator when ΔVh is changed from 0 to 200 [%]. As is apparent from FIG. 12, as ΔVh increases, the value of the switching frequency decreases. Also, as ΔVh increases, the shape of the switching frequency characteristic changes from a trapezoidal shape to a convex shape, and the peak value of the switching frequency decreases.

Figures 13A, 13B:
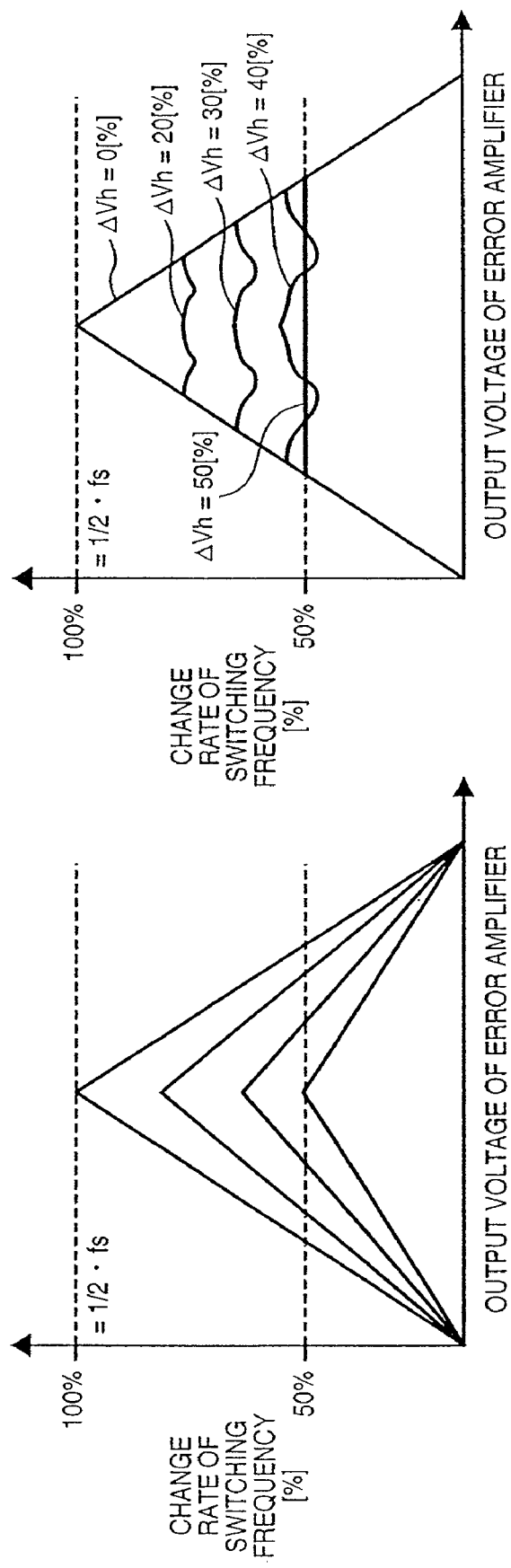
FIGS. 13A and 13B are graphs for explaining a change in switching frequency in the conventional switching power source and the switching power source according to the first embodiment of the present invention.

FIG. 13A is a graph showing changes in switching frequency when the maximum value of the switching frequency is changed at a given rate according to a conventional method. In FIG. 13A, the switching frequency changes at the same rate over the entire output range of the error amplifier.

FIG. 13B is a graph showing changes in switching frequency when ΔVh=0 to 40 [%]. As shown in FIG. 13B, the switching frequency decreases so that the vertex of a hilly shape is flatted into a trapezoidal shape.

Referring back to FIG. 12, the switching frequency at ΔVh=100 [%] or more slightly decreases even near the upper and lower limit values of the output voltage range of the error amplifier. In this range, however, the degree of decrease in switching frequency in a region except the upper and lower limit regions in the output range of the error amplifier is much larger.

From the above description, major features and effects of the first embodiment in comparison with the conventional art are roughly classified into the following three points.

(1) The conventional method adjusts the switching frequency of the switching power source by changing the sampling frequency of the ΔΣ modulator. To the contrary, the first embodiment gives a hysteresis width to the quantization reference value of the ΔΣ modulator. With the hysteresis width, the switching frequency can be decreased without decreasing the detection frequency of the output voltage value (load current value).

(2) In the conventional method, if the maximum value of the switching frequency is changed at a given rate, the switching frequency changes at the same rate over the entire output range of the error amplifier (see FIG. 13A). To the contrary, the first embodiment changes the switching frequency by changing the hysteresis width of the quantization reference value of the ΔΣ modulator. As a result, as shown in FIG. 12, the characteristic of the switching frequency to the output voltage of the error amplifier becomes trapezoidal. The switching frequency around the center of the possible voltage region of the output voltage of the error amplifier can be suppressed.

(3) The conventional technique changes the switching frequency digitally stepwise. The first embodiment can continuously adjust the switching frequency in an analog manner by controlling the hysteresis width of the ΔΣ modulator.

By these three features, the switching power source having the ΔΣ modulator can implement high efficiency and a quick response over a wide voltage output range by controlling the hysteresis width of the quantization reference value in the quantizer of the ΔΣ modulator. The switching frequency can be adjusted without complicating the circuit configuration or control.

Figure 10:
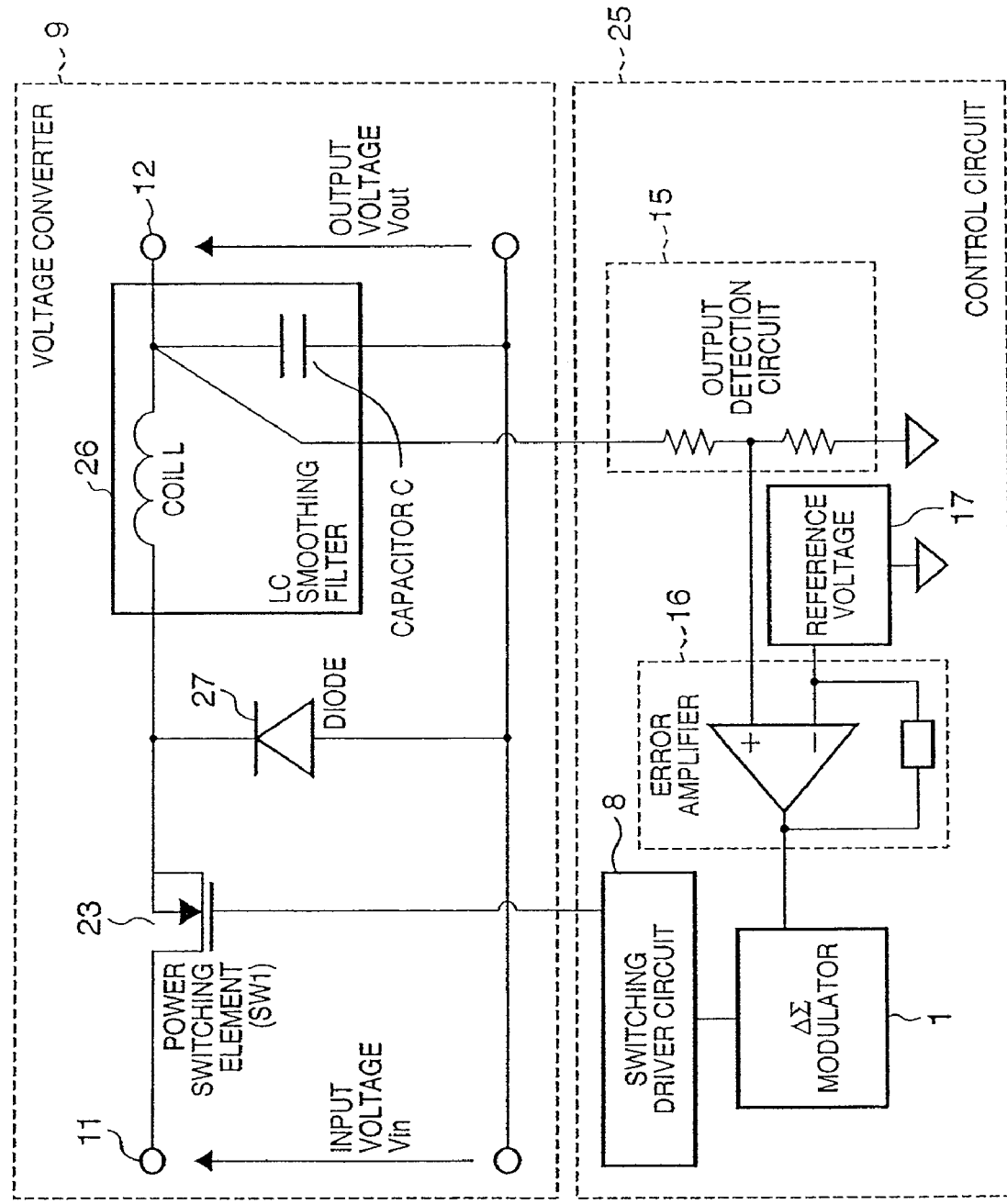
FIG. 10 is a block diagram showing the configuration of a diode rectification type switching power source having a conventional $\Delta\Sigma$ modulator.
Figure 11:
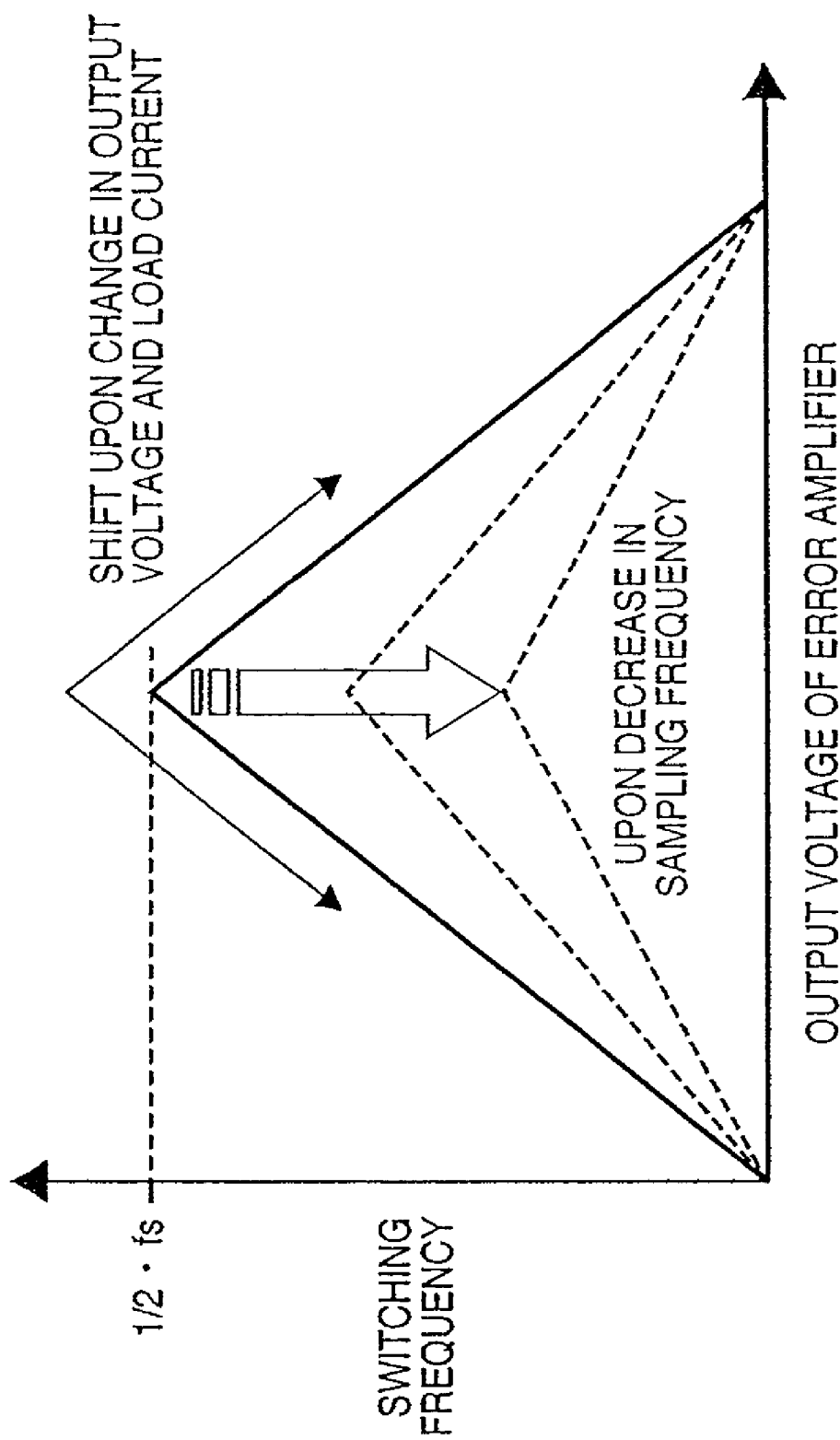
FIG. 11 is a graph showing a change in switching frequency when the sampling frequency is changed in a conventional switching power source.

For example, the configuration of the first embodiment can also be applied to a conventional diode rectification type switching power source shown in FIG. 10. This application can prevent an increase in switching loss in a region around the median of an output from the error amplifier at which the switching frequency maximizes when an output from the error amplifier changes due to an increase/decrease in load. That is, it is only necessary to design an appropriate hysteresis width and give it to the quantization reference value of the ΔΣ modulator.

(Modification)

In the first embodiment, the resistance value adjustment circuit adjusts the value of the variable resistor in the comparator to a proper value in accordance with an externally input detection signal, or a voltage and current detected by the detection circuit, thereby controlling the hysteresis width of the quantization reference value of the comparator. However, the method of controlling the hysteresis width of the quantization reference value of the comparator is not limited to this. Various methods are conceivable, and a plurality of methods may also be combined.

In this modification, the change range of an integrator output to the hysteresis width of the comparator is widened by adjusting the resistance value of the variable resistor R1, similar to the first embodiment, and also adjusting the value of a variable resistor incorporated in the integrator.

Figure 3:
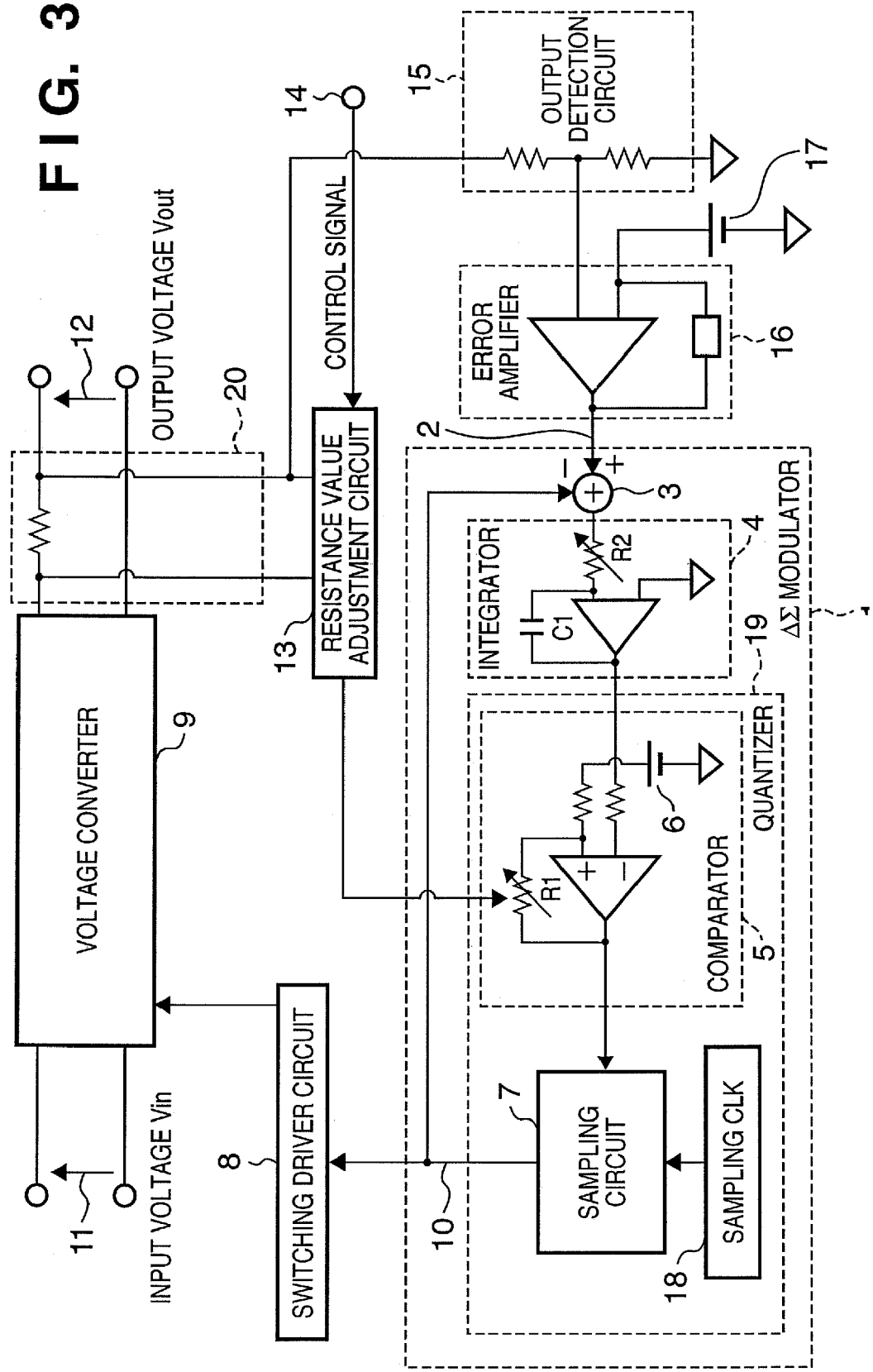
FIG. 3 is a block diagram showing the configuration of a switching power source according to a modification to the first embodiment.
Figure 4:
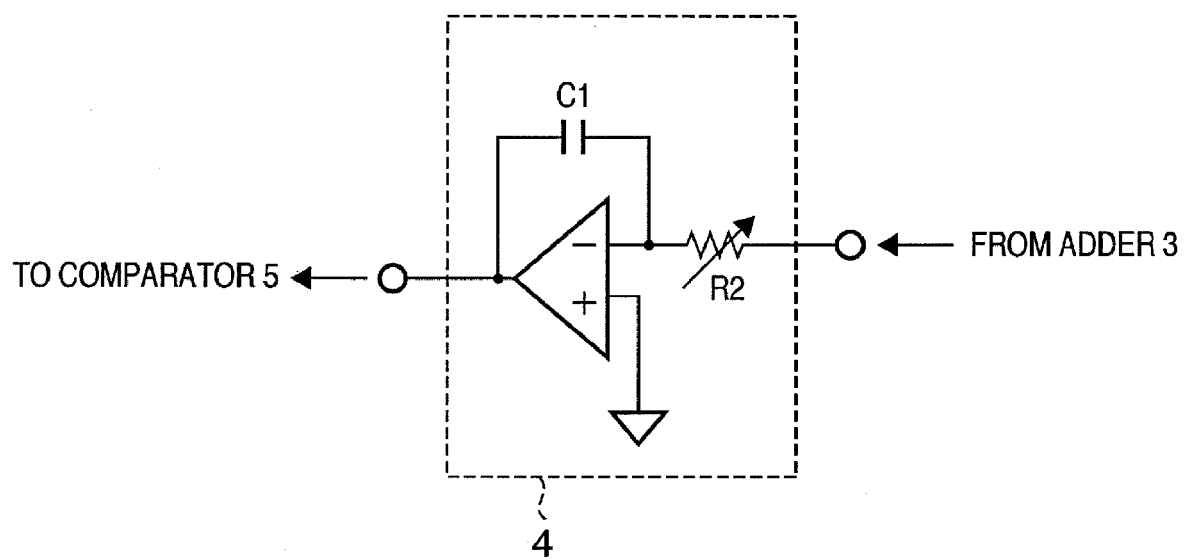
FIG. 4 is a block diagram showing the internal arrangement of an integrator in more detail according to the modification to the first embodiment.

FIG. 3 is a block diagram showing the configuration of a switching power source according to the modification. FIG. 4 is a block diagram showing the internal arrangement of the integrator 4 shown in FIG. 3 in more detail.

The configuration of the switching power source according to the modification is the same as that of the switching power source shown in FIG. 1 according to the first embodiment except the integrator 4. As shown in FIG. 4, the integrator 4 in the modification includes at least a variable resistor, capacitor, and operational amplifier.

The gain representing the ratio of an output voltage to an input voltage in the circuit shown in FIG. 4 is irrelevant to the gain of the operational amplifier as far as the frequency component of a signal input to the integrator 4 falls within the band of the operational amplifier. The gain is determined by only a value R2 of the variable resistor and a capacitance C1 of the capacitor shown in FIG. 3, and is proportional to the inverse of the product of the resistance value R2 and capacitance C1.

In this modification, the integration coefficient of the integrator 4 is adjusted by arranging a circuit which adjusts the value R2 of the variable resistor in FIG. 3 in accordance with a detection signal value from the detection circuit 20 or control signal detection terminal 14. This adjustment can provide the same effects as those obtained when the change amount of an integrator output to the hysteresis width of the comparator is adjusted to relatively widen the hysteresis width of the quantization reference value 6. Hence, the adjustable range of the switching frequency of the voltage converter 9 can be widened.

In this fashion, this modification can obtain the same effects as those of the first embodiment, and can control the hysteresis width of the quantization reference value by a simple circuit configuration.

<Second Embodiment>

A switching power source according to the second embodiment also adopts the same ΔΣ modulator as that in the first embodiment. A description of the same configuration as that in the first embodiment will be omitted, and a characteristic part of the second embodiment will be mainly explained.

Figure 5:
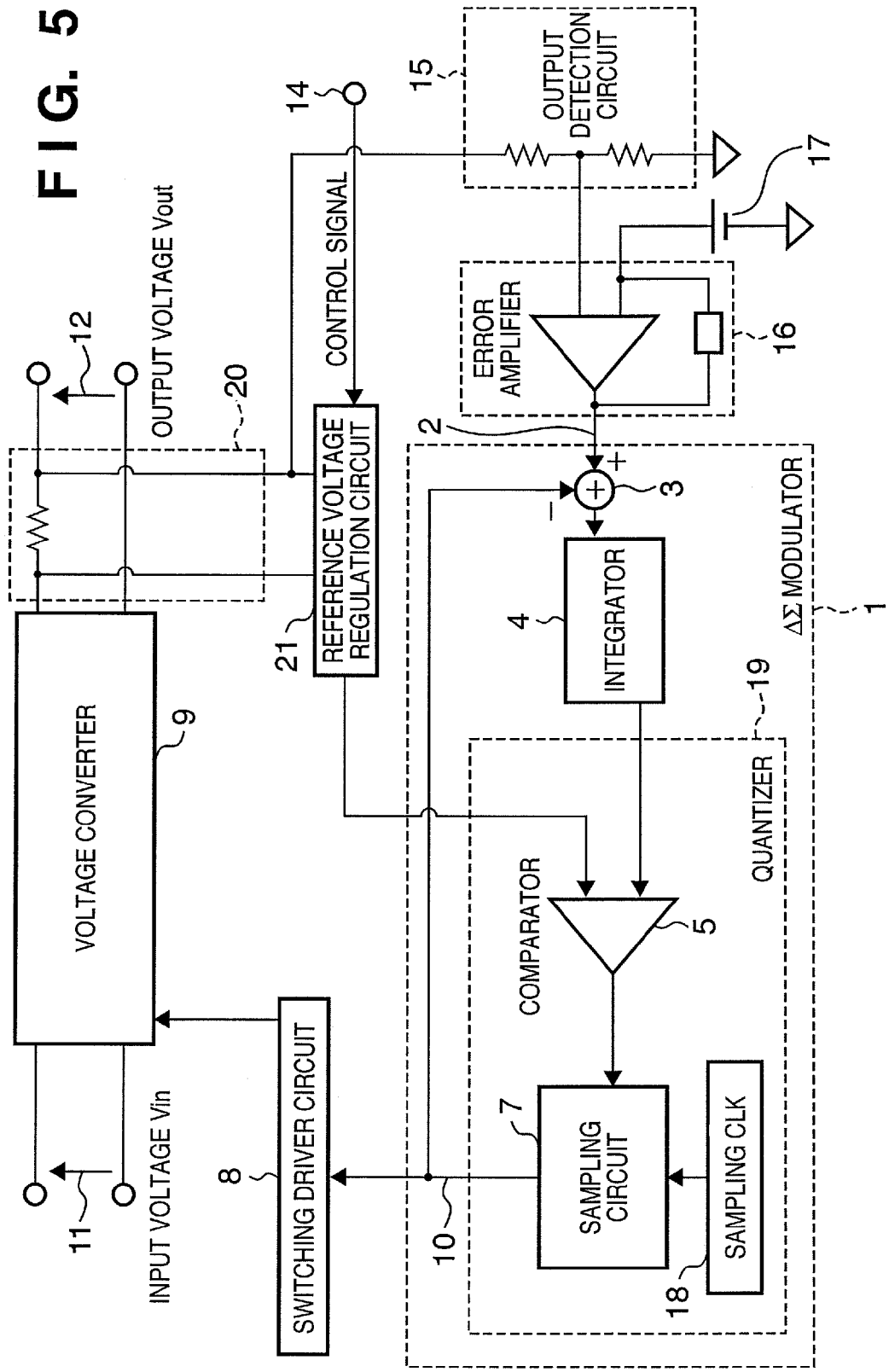
FIG. 5 is a block diagram showing the configuration of a switching power source according to the second embodiment of the present invention.

FIG. 5 is a block diagram showing the configuration of the switching power source according to the second embodiment of the present invention.

In FIG. 5, an output from an adder 3 passes through an integrator 4, and is compared with the output value of a reference voltage regulation circuit 21 by a comparator 5.

The reference voltage regulation circuit 21 outputs pulse voltages of two values to the comparator 5 on the basis of the output voltage (Vout) and load current of a voltage converter 9 that are detected by a detection circuit 20, or a control signal externally input from a control signal detection terminal 14. These two voltage values Va and Vb are switched in synchronism with the leading and trailing edges of a pulse signal from a switching duty pulse output line 10. The switched voltage value is output as a pulse signal to the comparator 5, and functions as a quantization reference value.

As described above, the second embodiment can obtain the same effects as those of the first embodiment. In addition, the control range of the hysteresis width of the quantizer can be set wider than that in the first embodiment because the two quantization reference values Va and Vb are switched by the reference voltage regulation circuit 21 for adjusting the quantization reference value.

<Third Embodiment>

A switching power source according to the third embodiment also adopts the same ΔΣ modulator as those in the first and second embodiments. A description of the same configuration as those in the first and second embodiments will be omitted. A characteristic part of the third embodiment will be mainly explained.

Figure 6:
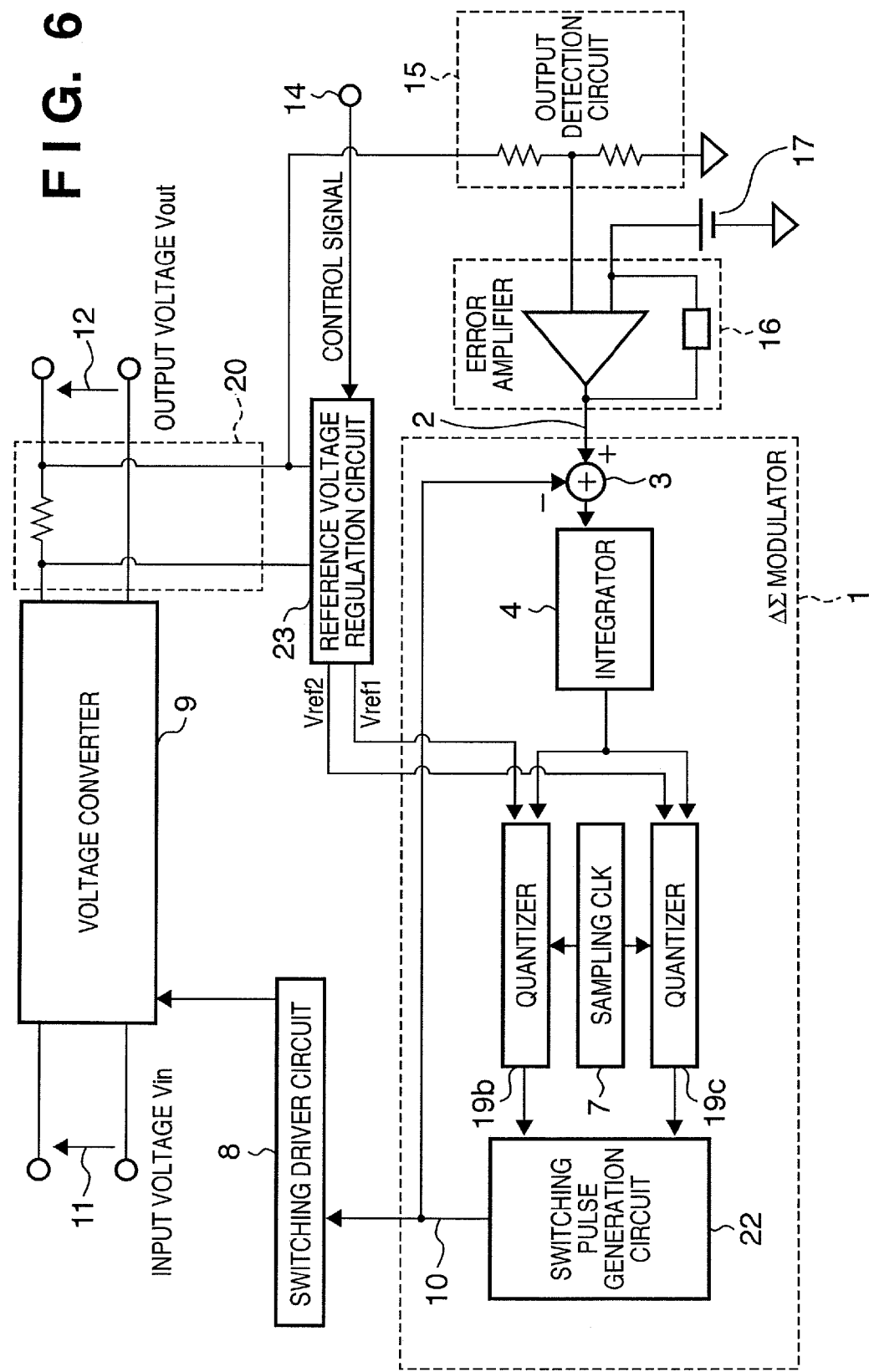
FIG. 6 is a block diagram showing the configuration of a switching power source according to the third embodiment of the present invention.

FIG. 6 is a block diagram showing the configuration of the switching power source according to the third embodiment of the present invention.

In FIG. 6, an output from an adder 3 passes through an integrator 4, and is input to two quantizers 19b and 19c. The quantizers 19b and 19c execute sampling in the cycle of the same sampling clock output from a sampling clock oscillation circuit 7. The quantization reference values of the quantizers 19b and 19c are Vref1 and Vref2, respectively, which are output from a reference voltage regulation circuit 23. Two output signals quantized by the quantizers 19b and 19c are processed by a switching pulse generation circuit 22, and output from a switching duty pulse output line 10.

The reference voltage regulation circuit 23 adjusts the quantization reference values (Vref1 and Vref2) on the basis of the output voltage (Vout) and load current of a voltage converter 9 that are detected by a detection circuit 20, or a control signal externally input from a control signal detection terminal 14.

The operation of a signal process by the switching pulse generation circuit 22 will be explained with reference to a timing chart shown in FIG. 7.

Figure 7:
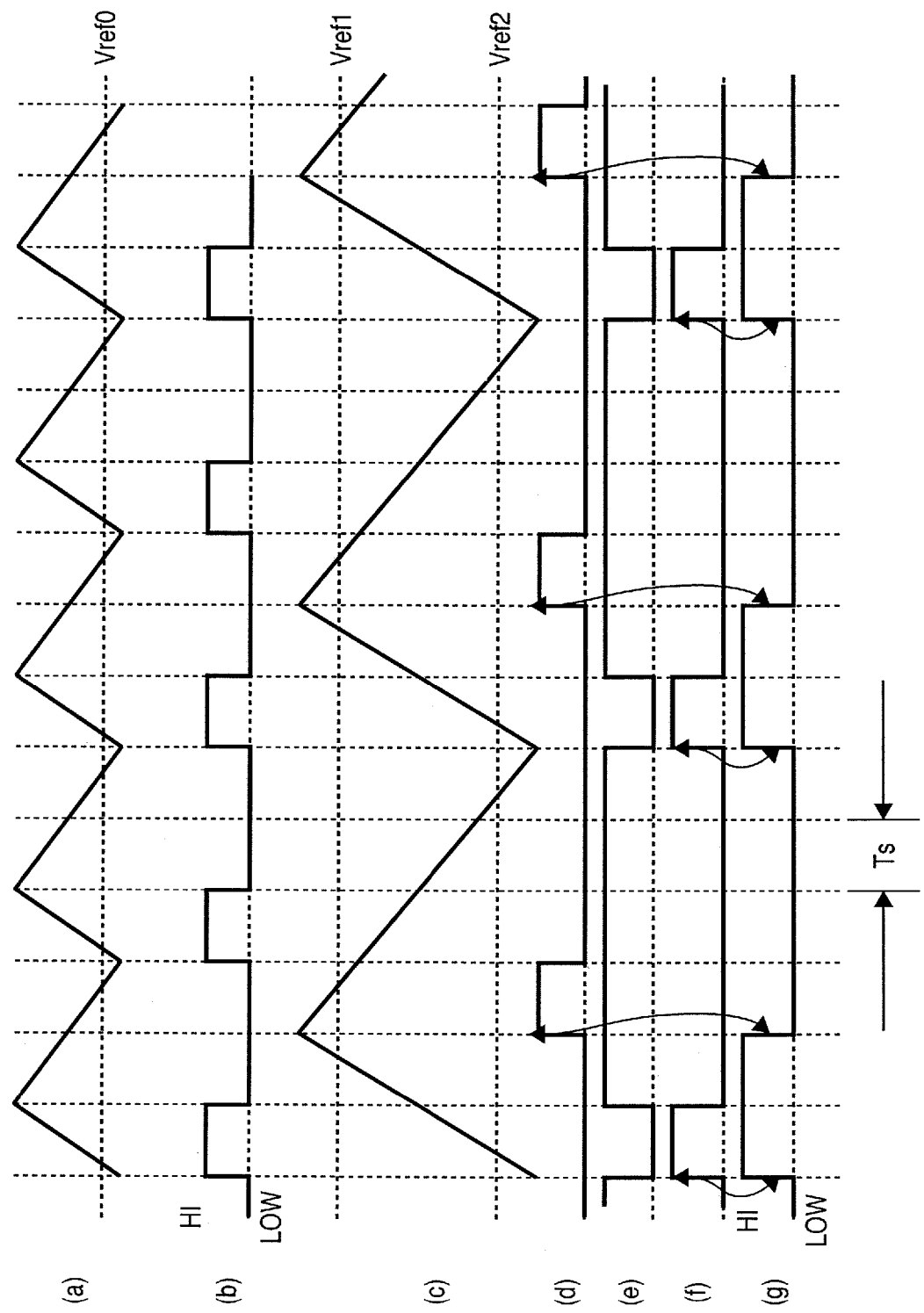
FIG. 7 is a timing chart showing an example of the output waveform of the integrator of the switching power source and the state of a quantized signal output from a $\Delta\Sigma$ modulator.

FIG. 7 is a timing chart showing the output waveforms of integrators in a conventional switching power source (to be referred to as switching power source D hereinafter) and the switching power source (to be referred to as switching power source E hereinafter) shown in FIG. 6, and the states of quantized signals output from the ΔΣ modulators of these switching power sources.

Switching power sources D and E are different in only a configuration associated with the quantization reference value of the ΔΣ modulator, and identical in the remaining basic configuration and circuit constants. The quantization reference value of switching power source D is "Vref0". The quantized value of switching power source D changes to low level (LOW) when the output voltage (V) of the integrator is V≧Vref0, and high level (HI) when V<Vref0.

The quantization reference value of switching power source E has a hysteresis width ΔVe (=Vref1−Vref2). The quantized value of an output signal (g) of the switching pulse generation circuit 22 changes to low level when the output voltage (V) of the integrator is V≧Vref1, and high level when V<Vref2. Note that an output from the integrator 4 increases and decreases with the same gradients in the two power sources.

In FIG. 7, (a) shows the output voltage waveform of the integrator in switching power source D, and (b) shows an output from the ΔΣ modulator in switching power source D. In FIG. 7, (c) shows the output voltage waveform of the integrator in switching power source E, and (g) shows an output from the ΔΣ modulator in switching power source E. The output voltages of the two switching power sources are sampled at timings of the sampling cycle (Ts) that are represented by vertical broken lines in FIG. 7.

In FIG. 7, (d) shows a signal output from the quantizer 19b, (e) shows a signal output from the quantizer 19c, and (f) shows an inverted signal of the signal (e). The switching pulse generation circuit 22 inverts the signal (e) to generate a signal (f). The switching pulse generation circuit 22 outputs a high-level signal in synchronism with the leading edge of the pulse signal (f), and a low-level signal in synchronism with the leading edge of the pulse signal (d). In this manner, the signal (g) is generated.

An example of the signal process by the switching pulse generation circuit 22 has been described. Similarly, by using hysteresis widths based on two quantization reference values, the switching frequency in a region around the median of the output voltage of the error amplifier can be reduced, thus attaining the same effects as those of the first and second embodiments.

Note that the switching pulse generation circuit 22 can be easily implemented by a logic circuit, particularly a programmable IC (PLD) or the like.

As has been described above, the third embodiment can attain the same effects as those of the first and second embodiments. In addition, the switching pulse generation circuit can be easily implemented by a logic circuit, particularly a programmable IC (PLD), and thus easily assembled into a digital control circuit. Further, a quantizer having a different quantization reference value can be added to monitor the output voltage of the integrator and easily implement a function such as a protective circuit against a rush current upon activation of the power source.

<Application Example of Invention>

The switching power sources described in the first to third embodiments according to the present invention can be applied to various electric apparatuses. A printing apparatus which prints by an inkjet method will be exemplified.

Figure 16:
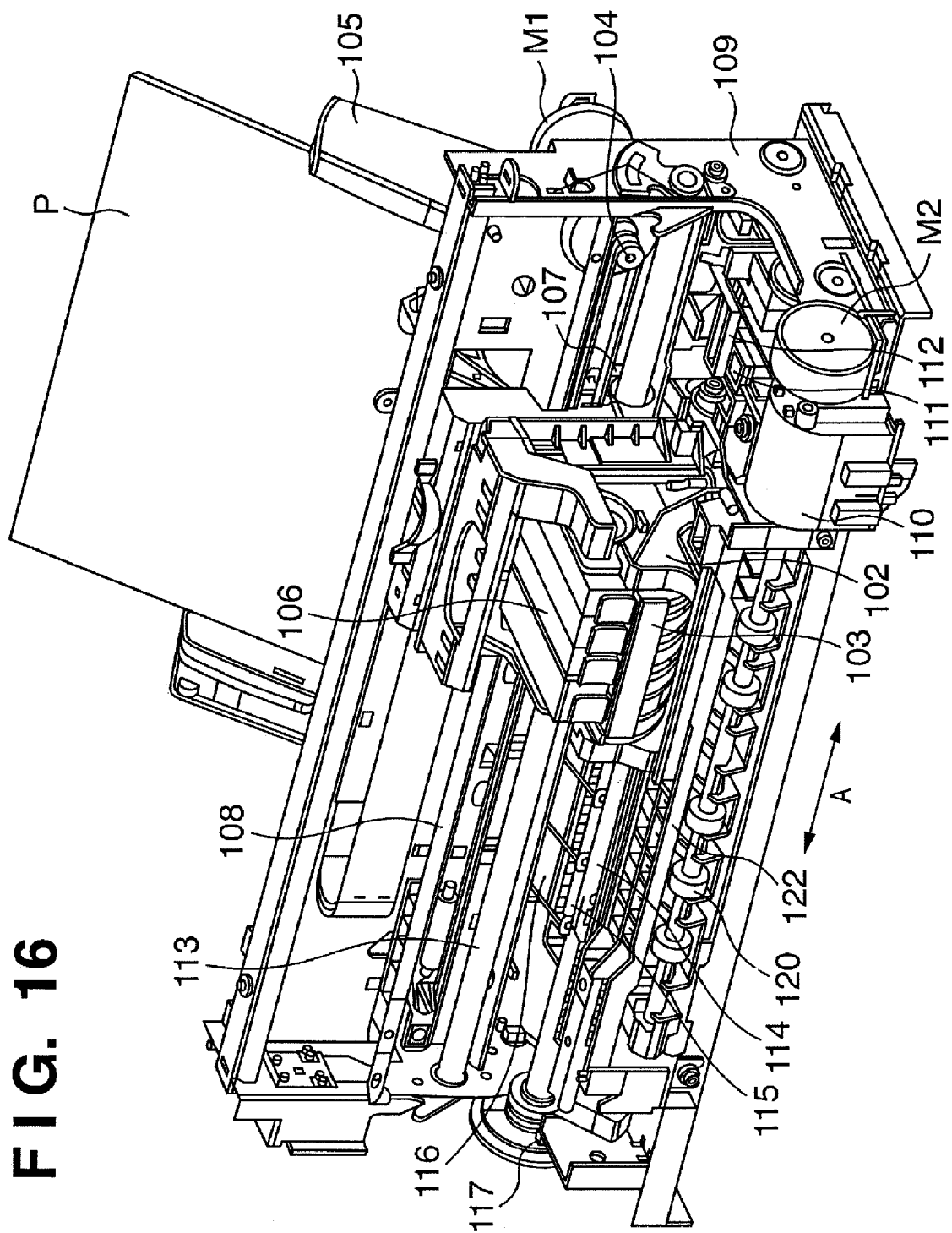
FIG. 16 is an outer perspective view showing the schematic configuration of an inkjet printing apparatus as a typical application example of the present invention.

FIG. 16 is an outer perspective view showing the schematic configuration of an inkjet printing apparatus to which the switching power source according to the present invention is applied.

As shown in FIG. 16, the inkjet printing apparatus (to be referred to as a printing apparatus hereinafter) mounts a printhead 103 which prints by discharging ink according to the inkjet method. A driving force generated by a carriage motor M1 is transmitted via a transmission mechanism 104 to a carriage 102, and the carriage 102 reciprocates in a direction indicated by an arrow A. At the same time, a printing medium P such as a printing sheet is fed via a sheet feed mechanism 105, and conveyed to a printing position. At the printing position, the printhead 103 discharges ink to the printing medium P to print.

In order to maintain a good state of the printhead 103, the carriage 102 is moved to the position of a recovery device 110, and a discharge recovery process for the printhead 103 is executed intermittently.

The carriage 102 supports not only the printhead 103, but also an ink cartridge 106 which stores ink to be supplied to the printhead 103. The ink cartridge 106 is detachable from the carriage 102.

The printing apparatus shown in FIG. 16 can print in color. For this purpose, the carriage 102 supports four ink cartridges which respectively store magenta (M), cyan (C), yellow (Y), and black (K) inks. The four ink cartridges are independently detachable.

The carriage 102 and printhead 103 can achieve and maintain a predetermined electrical connection by properly bringing their contact surfaces into contact with each other. The printhead 103 selectively discharges ink from a plurality of orifices and prints by applying energy in accordance with the printing signal. In particular, the printhead 103 in this application employs an inkjet method of discharging ink by using thermal energy. According to this method, electric energy applied to the electrothermal transducer of the printhead is converted into thermal energy, which is applied to ink. Ink is discharged from orifices by using a change in pressure upon growth and shrinkage of bubbles by generated film boiling. The electrothermal transducer is arranged in correspondence with each orifice, and ink is discharged from a corresponding orifice by applying a pulse voltage to a corresponding electrothermal transducer in accordance with the printing signal.

As shown in FIG. 16, the carriage 102 is coupled to part of a driving belt 107 of the transmission mechanism 104 which transmits the driving force of the carriage motor M1. The carriage 102 is slidably guided and supported along a guide shaft 113 in the direction indicated by the arrow A. The carriage 102 reciprocates along the guide shaft 113 by normal rotation and reverse rotation of the carriage motor M1. A scale 108 which represents the absolute position of the carriage 102 is arranged along the moving direction (direction indicated by the arrow A) of the carriage 102. In this application the scale 108 is prepared by printing black bars on a transparent PET film at a necessary pitch. One end of the scale 108 is fixed to a chassis 109, and its other end is supported by a leaf spring (not shown).

The printing apparatus has a platen (not shown) facing the orifice surface of the printhead 103, which has orifices (not shown). The carriage 102 supporting the printhead 103 reciprocates by the driving force of the carriage motor M1. At the same time, a printing signal is supplied to the printhead 103 to discharge ink. As a result, printing is done on the entire width of the printing medium P conveyed onto the platen.

In FIG. 16, reference numeral 114 denotes a conveyance roller which is driven by a conveyance motor M2 in order to convey the printing medium P; 115, a pinch roller which makes the printing medium P abut against the conveyance roller 114 by a spring (not shown); 116, a pinch roller holder which rotatably supports the pinch roller 115; and 117, a conveyance roller gear which is fixed to one end of the conveyance roller 114. The conveyance roller 114 is driven by rotation of the conveyance motor M2 that is transmitted to the conveyance roller gear 117 via an intermediate gear (not shown).

Reference numeral 120 denotes a discharge roller which discharges the printing medium P bearing an image formed by the printhead 103 outside the printing apparatus. The discharge roller 120 is driven by transmitting rotation of the conveyance motor M2. The discharge roller 120 abuts against a spur roller (not shown) which presses the printing medium P by a spring (not shown). Reference numeral 122 denotes a spur holder which rotatably supports the spur roller.

As shown in FIG. 16, in the printing apparatus, the recovery device 110 which recovers the printhead 103 from a discharge failure is arranged outside the reciprocation range for printing operation of the carriage 102 supporting the printhead 103. The recovery device 110 is situated in a desired position (e.g., a position corresponding to the home position) outside the printing region.

The recovery device 110 comprises a capping mechanism 111 which caps the orifice surface of the printhead 103, and a wiping mechanism 112 which cleans the orifice surface of the printhead 103. The recovery device 110 uses suction means (suction pump or the like) within the recovery device to forcibly discharge ink from orifices in synchronism with capping of the orifice surface by the capping mechanism 111. Accordingly, the recovery device 110 achieves a discharge recovery process of removing ink with a high viscosity and/or bubbles in the ink channel of the printhead 103.

In non-printing operation or the like, the orifice surface of the printhead 103 is capped by the capping mechanism 111 to protect the printhead 103 and prevent evaporation and drying of ink. The wiping mechanism 112 is arranged near the capping mechanism 111, and wipes ink droplets attached to the orifice surface of the printhead 103.

The capping mechanism 111 and wiping mechanism 112 can maintain a normal ink discharge state of the printhead 103.

Figure 17:
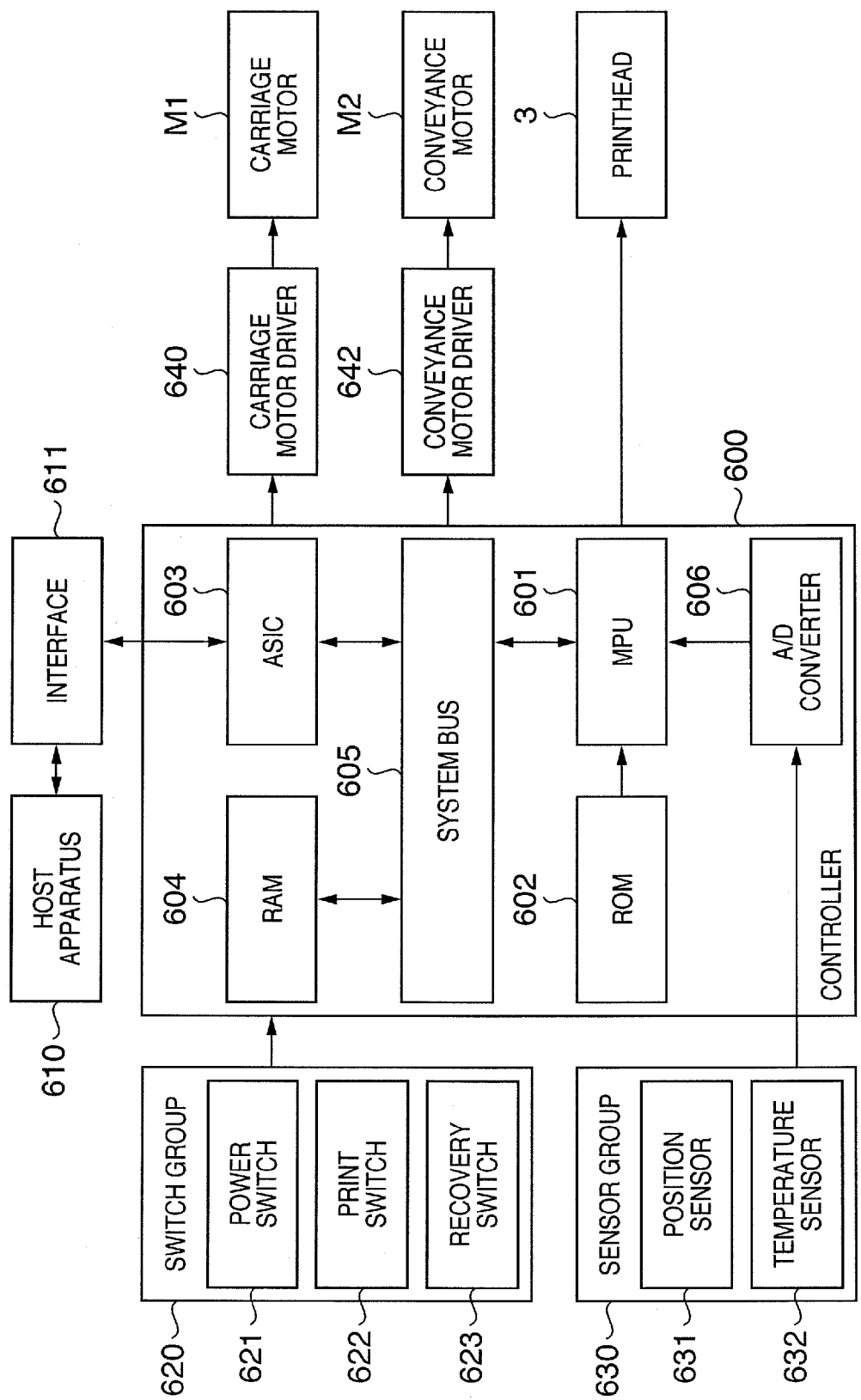
FIG. 17 is a block diagram showing the configuration of the control circuit of the printing apparatus shown in FIG. 16.

FIG. 17 is a block diagram showing the control configuration of the printing apparatus shown in FIG. 16.

As shown in FIG. 17, a controller 600 comprises an MPU 601, ROM 602, ASIC (Application Specific Integrated Circuit) 603, and RAM 604. The ROM 602 stores a program corresponding to a control sequence, a predetermined table, and other permanent data. The ASIC 603 generates control signals for controlling the carriage motor M1, conveyance motor M2, and printhead 103. The RAM 604 is used as an image data rasterizing area, a work area for executing the program, and the like. A system bus 605 connects the RAM 604, MPU 601, and ASIC 603 to each other, and allows exchanging data. The controller 600 comprises an A/D converter 606 which receives analog signals from a sensor group (to be described below), A/D-converts the analog signals, and supplies digital signals to the MPU 601.

The controller 600 outputs a control signal, which is input to the control signal detection terminal 14 in FIG. 1 (similarly to the control signal detection terminal 14 in FIG. 5 and that in FIG. 6). The control signal is a low-level signal when the printing apparatus is in a standby state. When the printing apparatus performs control (e.g. printing operation by the printhead, preliminary discharge operation, or motor driving control) in which power consumption abruptly varies (output voltage of the power source fluctuates), the control signal changes to high level. By inputting this control signal, the switching power source as described in the first to third embodiments is controlled.

In FIG. 17, reference numeral 610 denotes a computer (or an image reader, digital camera, or the like) which serves as an image data supply source and is generally called a host apparatus. The host apparatus 610 and a printing apparatus 1 transmit/receive image data, commands, status signals, and the like via an interface (I/F) 611.

A switch group 620 is formed from switches (e.g., a power switch 621, print switch 622, and recovery switch 623) for receiving instruction inputs from the operator. The print switch 622 is used to designate the start of printing. Through the recovery switch 623, the user designates the activation of a process (recovery process) of maintaining good ink discharge performance of the printhead 103. A sensor group 630 includes a position sensor 631 such as a photocoupler for detecting a home position h, and a temperature sensor 632 arranged at a proper position of the printing apparatus in order to detect the ambient temperature. These sensors detect the state of the apparatus.

Reference numeral 640 denotes a carriage motor driver which drives the carriage motor M1 for reciprocating the carriage 102 in the direction indicated by the arrow A; and 642, a conveyance motor driver which drives the conveyance motor M2 for conveying the printing medium P.

In printing and scanning by the printhead 103, the ASIC 603 transfers driving data (DATA) for a printing element (heater) to the printhead while directly accessing the storage area of the RAM 604.

The switching power source according to the present invention can be used as the power source of the printing apparatus main body having the above configuration, but can also be used as the power source of another electric apparatus.

The form of the printing apparatus according to the present invention is not limited to the above-described printing apparatus, and may be an information processing apparatus (e.g., computer) or the display of a television set or information processing apparatus. Further, the form of the printing apparatus may be an image output terminal which is arranged integrally with or separately from the information processing apparatus. The form of the printing apparatus may also be a copying machine combined with a reader, finisher, sorter, and the like, or a facsimile apparatus having transmission and reception functions.

The above-described embodiments have exemplified a configuration in which the quantization reference value is changed to two values or two different quantization reference values are set in order to change the hysteresis width of the quantization reference value. However, the present invention is not limited to the above embodiments. The present invention can employ any configuration as far as the value of a quantized output from the quantizer has a hysteresis characteristic to an input and the width of the hysteresis characteristic is changed.

For example, three or more values may be set as the quantization reference value, and the number of bit(s) of the quantized output is not limited to 1.

Moreover, the present invention may be applied to a system formed from a plurality of devices. For example, the present invention can also be applied to a case where power is supplied to a digital camera, portable device, or the like via a USB interface or the like.

As many apparently widely different embodiments of the present invention can be made without departing from the spirit and scope thereof, it is to be understood that the invention is not limited to the specific embodiments thereof except as defined in the appended claims.

This application claims the benefit of Japanese Application Nos. 2005-040894, filed Feb. 17, 2005, and 2006-018015, filed Jan. 26, 2006, which are hereby incorporated by reference herein in their entirety.

What is claimed is:

1. A switching power source having an integrator which integrates an input signal, a comparator which compares an output from the integrator with a quantization reference value, a sampling circuit which samples an output from the comparator in synchronism with a clock signal, and a modulator which quantizes the output from the integrator, outputs a quantized signal, and negative-feeds back the quantized signal to suppress a quantization error of the input signal, thereby modulating an analog signal or multi-bit digital signal by the modulator, and driving a power switching element in accordance with the quantized signal to supply power, the switching power source comprising:

input means for externally inputting a control signal; and reference value control means for changing a hysteresis width of the quantization reference value of the comparator on the basis of the control signal input by said input means, wherein said reference value control means changes a constant of a circuit of the comparator and a constant of a circuit of the integrator to change the hysteresis width of the quantization reference value and a change rate in time of an output from the integrator.

2. The switching power source according to claim 1, wherein the modulator includes a ΔΣ modulator.

3. The switching power source according to claim 1, further comprising a detection circuit which detects at least one of an output voltage and load current of the switching power source, and the externally input control signal.

4. The switching power source according to claim 1, wherein said reference value control means decreases the hysteresis width in a case where a quick response to a change in an output from the switching power source is required, and otherwise increases the hysteresis width in order to decrease a switching frequency of the power switching element.

5. The switching power source according to claim 1, wherein when a value of the input signal falls within a region around a median of a change range of the input signal, said reference value control means changes the hysteresis width so as to decrease a switching frequency of the power switching element.

6. The switching power source according to claim 1, wherein both of the comparator and the integrator have respective variable resistors, and said reference value control means changes resistance values of the variable resistors to change the hysteresis width of the quantization reference value and the change rate in time of an output from the integrator.

7. The switching power source according to claim 3, wherein said reference value control means adjusts a plurality of quantization reference values in accordance with a signal output from said detection circuit, and switches the plurality of quantization reference values in synchronism with a leading edge and trailing edge of a pulse of the quantized signal.

8. The switching power source according to claim 2, wherein the ΔΣ modulator includes a plurality of quantizers, and said reference value control means sets different quantization reference values for the plurality of quantizers.

9. An electric apparatus using a switching power source according to any of claims 1 to 5 and 6 to 8.

10. A printing apparatus using a switching power source according to any of claims 1 to 5 and 6 to 8.

11. A control method applied to a switching power source having an integrator which integrates an input signal, a comparator which compares an output from the integrator with a quantization reference value, a sampling circuit which samples an output from the comparator in synchronism with a clock signal, and a modulator which quantizes the output from the integrator, outputs a quantized signal, and negative-feeds back the quantized signal to suppress a quantization error of the input signal, thereby modulating an analog signal or multi-bit digital signal by the modulator, and driving a power switching element in accordance with the quantized signal to supply power, the control method comprising:

an input step of externally inputting a control signal; and a reference value control step of changing a hysteresis width of the quantization reference value of the comparator on the basis of the control signal input in the input step, wherein said reference value control step changes a constant of a circuit of the comparator and a constant of a circuit of the integrator to change the hysteresis width of the quantization reference value and a change rate in time of an output from the integrator.

* * * * *